United States Patent
Lee

(10) Patent No.: US 11,372,564 B2
(45) Date of Patent: Jun. 28, 2022

(54) APPARATUS AND METHOD FOR DYNAMICALLY ALLOCATING DATA PATHS IN RESPONSE TO RESOURCE USAGE IN DATA PROCESSING SYSTEM

(71) Applicant: SK hynix Inc., Gyeonggi-do (KR)

(72) Inventor: Kyung-Soo Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 237 days.

(21) Appl. No.: 16/691,190

(22) Filed: Nov. 21, 2019

(65) Prior Publication Data

US 2020/0174687 A1 Jun. 4, 2020

(30) Foreign Application Priority Data

Nov. 30, 2018 (KR) ........................ 10-2018-0152014

(51) Int. Cl.
G06F 3/06 (2006.01)
G06F 13/16 (2006.01)
G06F 13/362 (2006.01)

(52) U.S. Cl.
CPC ............ *G06F 3/0635* (2013.01); *G06F 3/061* (2013.01); *G06F 3/0614* (2013.01); *G06F 3/0631* (2013.01); *G06F 3/0644* (2013.01); *G06F 3/0656* (2013.01); *G06F 3/0659* (2013.01); *G06F 3/0683* (2013.01); *G06F 13/161* (2013.01); *G06F 13/1605* (2013.01); *G06F 13/362* (2013.01)

(58) Field of Classification Search
CPC ...... G06F 3/061; G06F 3/0614; G06F 3/0631; G06F 3/0635; G06F 3/0644; G06F 3/0656; G06F 3/0659; G06F 3/0683; G06F 13/1605; G06F 13/161; G06F 13/362
See application file for complete search history.

(56) References Cited

U.S. PATENT DOCUMENTS

| | | | |
|---|---|---|---|
| 4,878,166 A | 10/1989 | Johnson et al. | |
| 5,060,140 A | 10/1991 | Brown et al. | |
| 6,167,558 A * | 12/2000 | Trimberger | G01R 31/318519 716/117 |
| 7,984,415 B1 * | 7/2011 | Srinivasan | G06F 30/327 716/139 |

(Continued)

FOREIGN PATENT DOCUMENTS

| | | |
|---|---|---|
| KR | 10-2014-0000182 | 1/2014 |
| KR | 10-2014-0095832 | 8/2014 |
| KR | 10-2017-0008153 | 1/2017 |

*Primary Examiner* — Eric T Oberly
(74) *Attorney, Agent, or Firm* — IP & T Group LLP

(57) ABSTRACT

A data processing system includes a plurality of resources suitable for processing data, a host suitable for requesting at least one of the plurality of resources to process the data, a plurality of data paths suitable for transferring the data between the host and the plurality of resources, and an arbiter suitable for dividing the plurality of resources into a plurality of groups, allocating at least one first data path of the plurality of data paths to each of the groups, and rearranging the plurality of groups, based on their respective transmission statuses, by additionally allocating at least one second data path of the plurality of data paths to each of the groups or by moving at least one resource from one of the plurality of groups to another of the plurality of groups.

22 Claims, 11 Drawing Sheets

(56) References Cited

U.S. PATENT DOCUMENTS

| | | | | |
|---|---|---|---|---|
| 2009/0016373 A1* | 1/2009 | Kimura | ................ | H04J 3/1682 370/462 |
| 2011/0004875 A1* | 1/2011 | Elnozahy | .............. | G06F 9/5061 718/1 |
| 2015/0324255 A1 | 11/2015 | Kochunni et al. | | |

* cited by examiner

APPARATUS AND METHOD FOR DYNAMICALLY ALLOCATING DATA PATHS IN RESPONSE TO RESOURCE USAGE IN DATA PROCESSING SYSTEM

CROSS-REFERENCE TO RELATED APPLICATION

This application claims priority under 35 U.S.C. § 119 to Korean Patent Application No. 10-2018-0152014, filed on Nov. 30, 2018, which is incorporated herein by reference in its entirety.

BACKGROUND

1. Field

Various embodiments relate to a data processing system, and more particularly, to a control method and apparatus capable of dynamically allocating a plurality of data paths, through which data are transferred among components in the data processing system in response to usage of the components.

2. Discussion of the Related Art

Recently, the paradigm for the computing environment has changed to the ubiquitous computing environment in which computer systems can be used anytime, anywhere. Therefore, the use of portable electronic devices such as mobile phones, digital cameras and notebook computers has rapidly increased. The portable electronic devices generally use a memory system using a memory device, that is, a data storage device. The data storage device is used as a main or secondary memory device of the portable electronic device.

Since the data storage device using a nonvolatile memory device has no mechanical driver unlike a hard disk, the data storage device has excellent stability and durability, high information access speed, and low power consumption. In memory systems having such advantages, the data storage device may be any of a universal serial bus (USB) memory device, a memory card having various interfaces, a solid state drive (SSD), and the like.

SUMMARY

Various embodiments may provide a data processing system which includes memory systems and a host and can dynamically allocate a plurality of data paths for data transfer among the components based on the usages of the respective memory systems, and an operating method thereof.

Various embodiments may provide a method and apparatus which can decide wait counts for situations in which a data path cannot be immediately used and data transfer needs to wait; and control reallocation of data paths based on the wait counts, when data is to be transferred through the data path in response to a user's request under a situation of the data paths allocated to a plurality of components within a data processing system.

Various embodiments may provide a method and apparatus that can group a plurality of memory systems to allocate, to the groups of the memory systems, a plurality of data paths for transferring data between the plurality of memory systems and a host; and manage and control the efficiencies of data paths for each group in a data processing system including the host interworking with the plurality of memory systems.

Various embodiments may provide a method and apparatus that can group destinations to which data are transmitted through data paths, based on a threshold; decide a group wait count; and reallocate data paths allocated to each group based on the group wait count.

Various embodiments may provide a method and apparatus that can group destinations to which data are transmitted through data paths, based on a threshold; reset the threshold for grouping through a resource group wait count and a total wait count; and induce reallocation of data paths to the groups.

Technical objects of the present disclosure are not limited to the above-described technical objects, and other technical objects which are not described herein will be clearly understood by those skilled in the art to which the present disclosure pertains, based on the following descriptions.

Various embodiments are directed to a memory system, a data processing system and a method for checking an operation thereof.

In an embodiment, a data processing system may include: a plurality of resources suitable for processing data; a host suitable for requesting at least one of the plurality of resources to process the data; a plurality of data paths suitable for transferring the data between the host and the plurality of resources; and an arbiter suitable for: dividing the plurality of resources into a plurality of groups, allocating at least one first data path of the plurality of data paths to each of the groups, and rearranging the plurality of groups, based on their respective transmission statuses, by additionally allocating at least one second data path of the plurality of data paths to each of the groups or by moving at least one resource from one of the plurality of groups to tis another of the plurality of groups.

The number of the plurality of groups is smaller than the number of the plurality of resources, and smaller than or equal to the number of the plurality of data paths.

The numbers of resources included in the respective groups are not equal to one another.

The arbiter determines the data transmission status of each group by comparing a group wait count of each group to a total wait count. The group wait count of each group is increased when processing of the data by a resource belonging to the corresponding group waits because the data path allocated to the corresponding group is busy even though the host requested the resource of the corresponding group to process the data.

The arbiter additionally allocates, to a group having a group wait count per group that is the same as the total wait count, remaining data paths other than the at least one first data path as the at least one second data path.

The arbiter additionally allocates the at least one second data path to the respective groups according to ratios of each of the group wait counts to the total wait count.

The group wait count of one of the groups is 0, the arbiter reallocates the at least one second data path, which is currently allocated to the group, to another of the groups.

The arbiter equally allocates the data paths to the groups tis according to the number of the groups, the number of the resources within each of the groups, and the number of the data paths before the transfer of the data between the host and the plurality of resources.

The arbiter reallocates the at least one second data path currently allocated to each of the groups based on the data transmission statuses.

The arbiter rearranges the respective groups by merging two or more of the groups or dividing a single group into two or more groups.

In another embodiment, a method for controlling use of a plurality of data paths includes: dividing a plurality of resources into a plurality of groups, each of the resources being capable of processing data; allocating at least one first data path of the plurality of data paths to each of the groups for transfer of the data between the plurality of resources and a host that requests processing of the data; rearranging the plurality of groups, based on their respective data transmission statuses, by additionally allocating at least one second data path of the plurality of data paths to each of the groups or by moving at least one resource from one of the plurality of groups to another of the plurality of groups.

The number of the plurality of groups is smaller than the number of the plurality of resources, and smaller than or equal to the number of the plurality of data paths.

The numbers of resources included in the respective groups are not equal to one another.

The method further includes determining the data transmission status of each group by comparing a group wait count of each group to a total wait count. The group wait count of each group is increased when processing of the data by a resource of the corresponding group waits because the data path allocated to the corresponding group is busy even though the host requested the resource of the corresponding group to process the data.

The additional allocating includes allocating, to a group having a group wait count that is the same as the total wait count, remaining data paths other than the at least one first data path as the at least one second data path.

The additional allocating includes allocating the at least one second data path to the respective groups according to ratios of each of the group wait counts to the total wait count.

The method further includes reallocating, when the group wait count of one of the groups is 0, the second data path, which is currently allocated to the group, to another of the groups.

The method further includes equally allocating the data paths to the groups according to the number of the groups, the number of the resources within each of the groups, and the number of the data paths before the transfer of the data between the host and the plurality of resources.

The rearranging is performed by reallocating the at least one second data path currently allocated to each of the groups based on the tis data transmission statuses.

The rearranging is performed by merging two or more of the groups or dividing a single group into two or more groups.

In another embodiment, a storage system includes: one or more groups each including one or more memory systems each configured to perform a memory operation in response to a host request provided from a host; and an allocator operably coupled between the host and the groups, and configured to transfer host data regarding the host request between the host and a memory system within a selected group of the groups by dynamically allocating a transmission path to each of the groups based on an amount of pending host data to be transferred to the respective memory systems within the groups. The memory systems within each of the groups share one or more transmission paths allocated to the corresponding group.

In another embodiment, a storage system includes: one or more groups each including one or more memory systems each configured to perform a memory operation in response to a host request provided from a host; and an arranger operably coupled between the host and the respective groups through one or more transmission paths allocated to the respective groups, and configured to transfer host data regarding the host request between the host and a memory system within a selected group of the groups by dynamically arranging the memory systems within the respective groups based on an amount of pending host data to be transferred to the respective memory systems within the groups. The memory systems within each of the groups share one or more transmission paths allocated to the corresponding group.

DETAILED DESCRIPTION

The following description focuses on features and aspects of various embodiments of the present invention. Well-known information may be omitted in order not to unnecessarily obscure subject matter of the present invention.

Various embodiments are described in more detail below with reference to the accompanying drawings. Throughout the specification, reference to "an embodiment," "another embodiment" or the like is not necessarily to only one embodiment, and different references to any such phrase are not necessarily to the same embodiment(s).

Figure 1:
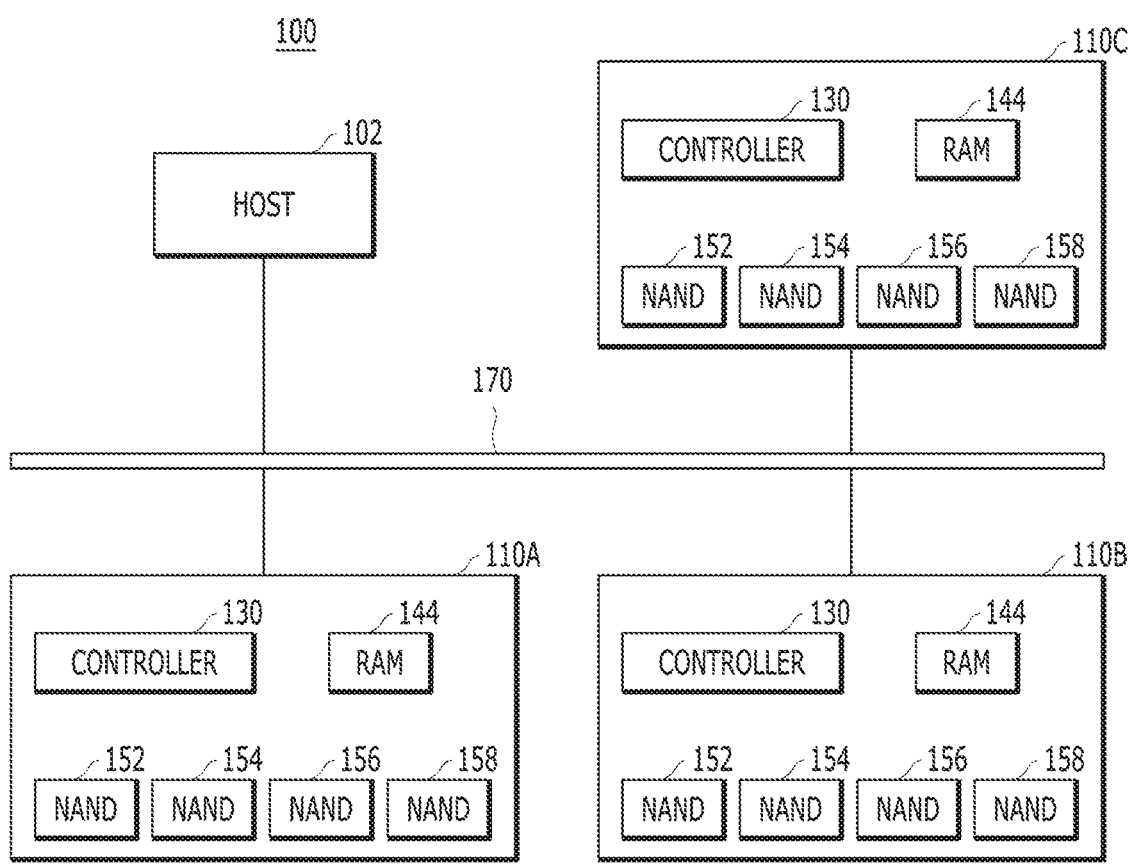
FIG. 1 is a diagram illustrating an example of a data processing system in accordance with an embodiment.

FIG. 1 is a diagram illustrating an example of a data processing system 100 in accordance with an embodiment.

Referring to FIG. 1, the data processing system 100 may include a plurality of resources, e.g., components, coupled to a host 102 through a plurality of data paths 170. For example, the plurality of resources within the data processing system 100 illustrated in FIG. 1 may include a plurality of memory systems 110A, 110B and 110C. The plurality of memory systems 110A, 110B and 110C may store or output data in response to a request of the host 102. FIG. 1 illustrates that the data processing system 100 includes three memory systems. More generally, however, the data processing system 100 may include two or more memory systems.

The resources included in the data processing system 100 may not be limited to the memory systems. The configuration and/or nature of the resources may depend on the design, use and operation environment of the data processing system 100. Each of the resources may transmit/receive a signal (for example, a command, response, data or the like) through one or more channels. The signal may be configured in a set format (for example, message or packet). The signal which can be transferred through one or more channels is referred to as data below.

The amount of data that each of the resources transfers through one or more channels may depend on the operation characteristics of the resource or on an operation of the data processing system 100 according to a user request. Therefore, the plurality of data paths 170 for transferring data between the host 102 and the plurality of resources may be dynamically allocated to the respective resources in response to an operation environment, operation state or the like.

Each of the memory systems 110A, 110B and 110C may include a controller 130, a memory 144, e.g., RAM, and a plurality of memory devices 152, 154, 156 and 158. In an embodiment, each of the plurality of memory devices 152, 154, 156 and 158 may include nonvolatile memory devices which can store data even though power is cut off. FIG. 1 illustrates that each of the memory systems 110A, 110B and 110C includes four memory devices. More generally, however, each memory system may include one or more memory devices.

Although not illustrated, each of the memory devices 152, 154, 156 and 158 may include one or more blocks, and each of the blocks may include a plurality of pages. The internal configurations and specific operations of the memory devices 152, 154, 156 and 158 are described below with reference to FIGS. 3 and 4.

The host 102 may include a computing device which can be used by a user. For example, the host 102 may include a personal computer such as a desktop or notebook computer, a mobile device such as a cellular phone, or a server which can be used in an office, school, research institute or the like. As the amount of data requested by a user is increased, the number of memory systems interworking with the host 102 may be increased.

Through the plurality of data paths 170, the host 102 and the plurality of memory systems 110A, 110B and 110C may transmit/receive commands and data at high speed. For this operation, the plurality of memory systems 110A, 110B and 110C and the host 102 may support serial communication through the plurality of data paths 170. For example, the serial communication method may include one or more protocols of MIPI (Mobile Industry Processor Interface) M-PHY, UART (Universal Asynchronous Receiver Transmitter), SPI (Serial Peripheral Interface Bus), I2C (Inter Integrated Circuit) and USB (Universal Serial Bus).

For example, when the plurality of memory systems 110A, 110B and 110C support the standard for universal flash storage (UFS) or embedded UFS (eUFS), the memory systems 110A, 110B and 110C and the host 102 may use high-speed serial communication interfaces based on the MIPI M-PHY. The M-PHY at a physical layer may indicate an embedded clock serial interface which has a very high bandwidth function and has been developed to support extreme performance and low-power requirements of a mobile application. The memory systems 110A, 1103 and 1100 may also support the UniPro standard at a link layer.

The memory systems 110A, 110B and 110C interworking with the host 102 may be given priorities. For example, the priorities may be divided into a primary priority and a secondary priority. In an embodiment, the priorities may be set to more levels or stages, and given to the plurality of memory systems 110A, 110B and 110C.

The host 102 interworking with the plurality of memory systems 110A, 110B and 110C may distinguish and recognize the plurality of memory systems 110A, 1108 and 110C. For this operation, the host 102 may assign identifiers or IDs to the respective memory systems 110A, 110B and 110C.

In an embodiment, the plurality of memory systems 110A, 1.10E and 110C may store a plurality of logical identifiers. Each of the memory systems 110A, 1103 and 110C may use a different logical identifier depending on the particular host with which the memory system interworks. For example, the second memory system 110b may use a logical identifier 'AB' when interworking with the host 102, but use a logical identifier 'ED' when interworking with another host (not illustrated). The logical identifiers that the plurality of memory systems 110A, 1108 and 110C use to communicate with the host 102 may be logical addresses which are used to decide the positions of data in one data processing system. In an embodiment, the logical identifiers which can be used between the host 102 and the plurality of memory systems 110A, 110B and 110C may be differently set.

The host 102 may utilize unique information of the plurality of memory systems 110A, 110E and 110C, in order to physically recognize the plurality of memory systems 110A, 110B and 110C. Examples of the logical identifiers which can be used between the host 102 and the plurality of memory systems 110A, 110B and 110C include universally unique identifiers (UUID). The UUID may include a 16-octet (128-bit) number. In the standard format, the UUID may be expressed as 32 hexadecimal digits, and include five groups of 8-4-4-4-12, which are composed of a total of 36 characters (32 characters and four hyphens). The UUID may be used as information which is included in a header within a packet whose format is decided according to a set communication protocol between the host 102 and the plurality of memory systems 110A, 110B and 110C, with set logical identifiers between the host 102 and the plurality of memory systems 110A, 110B and 110C.

The information for identification between the host 102 and the plurality of memory systems 110A, 110B and 110C may be stored in a specific region (for example, a master boot record (MBR)) of the first memory system 110A. When power is supplied to the host 102 and the plurality of memory systems 110A, 110B and 110C, data or firmware stored in a certain region of the first memory system 110A may be first executed. Therefore, the first memory system 110A may store basic information in a corresponding specific region, the basic information being used to physically recognize the host 102 and the plurality of memory systems 110B and 110C.

Based on the set logical identifiers between the host 102 and the plurality of memory systems 110A, 110E and 110C, data may be tis transmitted/received through a communication protocol to which the host 102 and the plurality of memory systems 110A, 110E and 1100 are connected. The communication protocol used between the host 102 and the plurality of memory systems 110A, 110B and 110C may support one or more masters and one or more slaves. If the communication protocol supports one master, the host 102 may become a master, and the plurality of memory systems 110A, 110E and 110C may become slaves. On the other hand, when the communication protocol supports a plurality of masters, the host and the first memory system (for example, 110A) with a high priority may become masters, and the other memory systems 110B and 110C may become slaves.

While the plurality of resources have high data input/output performance, the transfer rates of the data paths for transferring data between the host and the plurality of resources may be lower than the data input/output performance of the plurality of resources. Thus, when the plurality of resources operate according to the transfer rates at which data are transferred through the data paths, the plurality of resources may inefficiently operate.

Furthermore, a user may request a certain resource of the plurality of resources to process data, and the number of the resources may be different from the number of the data paths. Therefore, when a data path is fixedly allocated to a resource where data transfer does not frequently occur, the entire operation efficiency of the data processing system 100 may be degraded.

For example, when a sufficient number of data channels are arranged between the host 102 and the plurality of memory systems 110A, 110B and 110C, latency may not occur while data are transferred between the host 102 and the plurality of memory systems 110A, 110B and 110C. However, when the number of the data paths 170 is smaller than the number of the memory systems 110A, 110B and 110C or one memory system requires one or more data paths, it may be determined that the plurality of channels 170 are not enough to handle data throughput in such an operation environment. Therefore, an apparatus and method capable of allocating the plurality of channels 170 to the plurality of resources may be needed.

Figure 2:
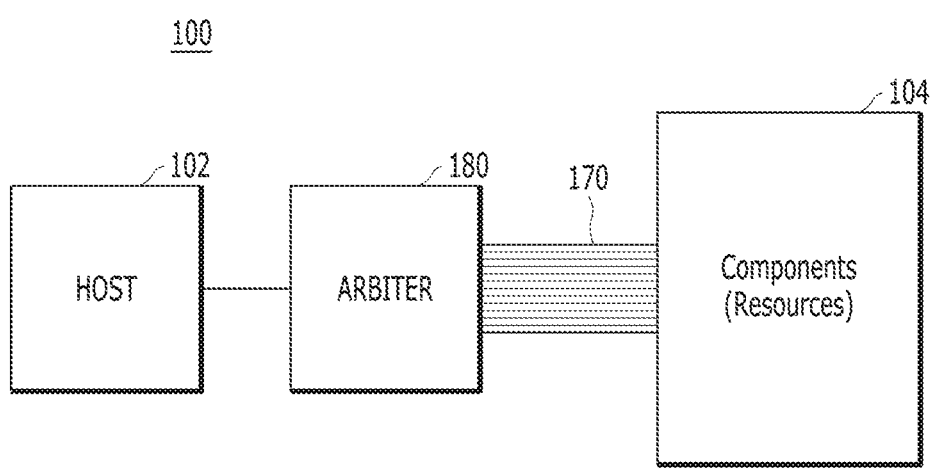
FIG. 2 is a diagram illustrating an example of an apparatus for controlling a plurality of data paths within a data processing system.

FIG. 2 is a diagram illustrating an example of an apparatus for controlling a plurality of data paths within a data processing system.

Referring to FIG. 2, the data processing system 100 may include a host 102, a plurality of resources 104, a plurality of data paths 170 for transferring data between the host 102 and the plurality of resources 104, and an arbiter 180 for controlling data transfer through the plurality of data paths 170. The arbiter 180 may allocate the plurality of data paths 170 to the plurality of resources 104 in response to a request of the host 102.

In an embodiment, the arbiter 180 may allocate the plurality of data paths 170 to the plurality of resources 104 based on one or more priorities requested by the host 102. There are different priority setting methods that may be employed by the host 102. One of the methods is a fixed priority policy, and another method is a round robin policy. Since the fixed priority policy is designed to be suitable for a single processor system, the performance of the fixed priority policy may not be improved in a multi-processor system. On the other hand, when the round robin policy is used for the multi-processor system, the round robin policy may have better characteristics than the fixed priority policy.

When the arbiter 180 repeats an operation of allocating data paths to the respective resources 104 and releasing the allocated data paths according to the fixed priority policy or the round robin policy, such operation may impose an overhead in the entire operation of the data processing system 100. Furthermore, although data transfer does not occur between each of the resources 104 and the host 102, one or more data paths may have to remain allocated. When there is no data path that operably connects a resource to the host 102, the host 102 may determine that the resource is not physically connected or operable. In particular, when the number of the data paths 170 is smaller than the number of the resources 104, it may not be efficient to allocate the plurality of data paths 170 according to the fixed priority policy or the round robin policy.

In an embodiment, the arbiter 180 may divide the plurality of resources 104 into a set number of groups. The number of groups may be smaller than the number of the data paths 170. The arbiter tis 180 may allocate one or more data paths to each of the groups. For example, suppose that the data processing system 100 includes nine memory systems as the plurality of resources 104, and the plurality of data paths 170 are configured as six data paths. For example, the arbiter 180 may divide the nine memory systems into three groups. The arbiter 180 may allocate one data path to each of the groups, and additionally allocate the other three data paths to a group with high transfer demand among the three groups. For another example, the arbiter 180 may allocate two data paths to each of the three groups, and then reallocate one of the two data paths allocated to each of the groups to another group based on the transfer demand of each of the groups.

In an embodiment, the transfer demand of each group may be checked through various methods. For example, data requested by the host 102 may not be immediately transferred through the arbiter 180 for each group because the data path allocated to the corresponding group is busy and thus data transfer may have to wait. The arbiter 180 may increase a group wait count for each of the groups whenever data transfer waits for a corresponding group. The arbiter 180 may compare the group wait counts of the respective groups and decide which group a data path needs to be additionally allocated. Through this operation, the arbiter 180 may analyze the use statuses of the data paths in real time and dynamically allocate the data paths, in order to raise the usage rates and efficiency of the plurality of resources 104 in the data processing system 100.

Figure 3:
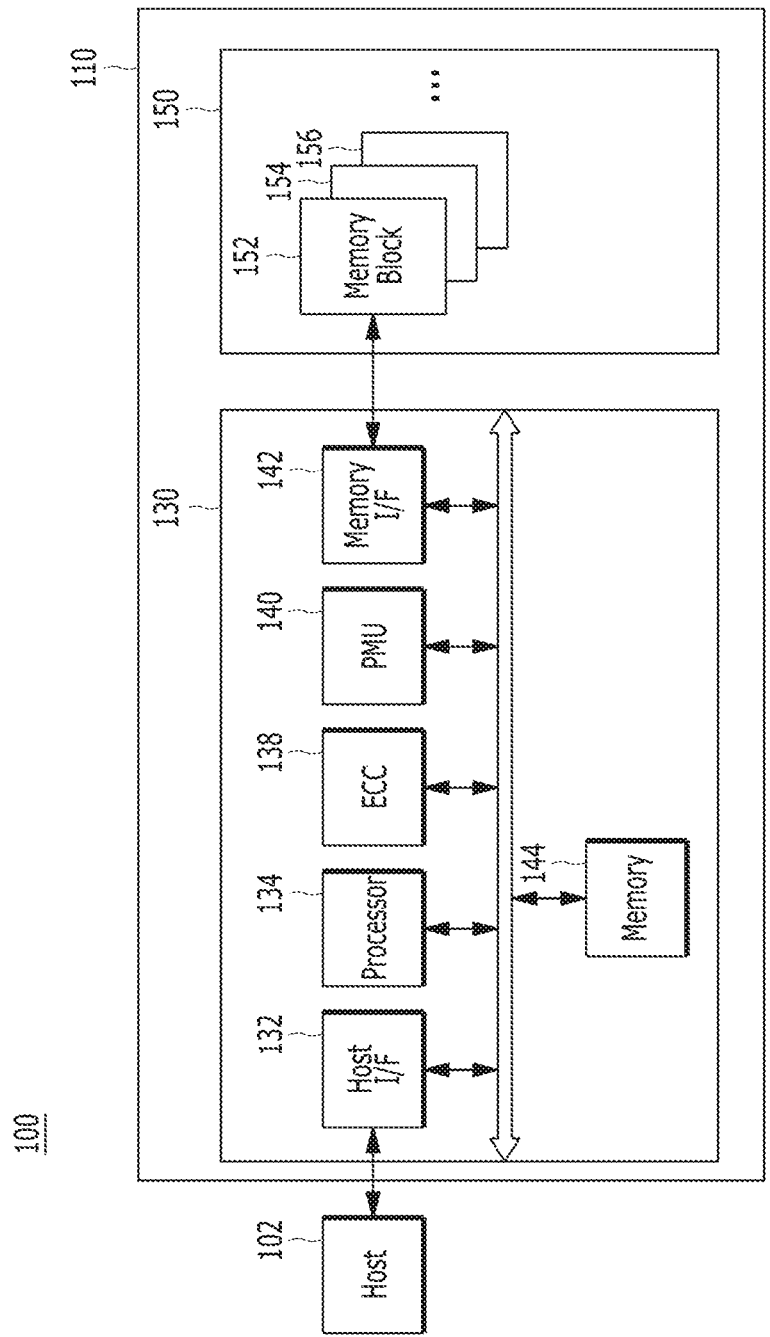
FIG. 3 is a diagram schematically illustrating an example of a data processing system including a memory system in accordance with an embodiment.

FIG. 3 is a diagram schematically illustrating a data processing system including a memory system in accordance with an embodiment.

Referring to FIG. 3, the data processing system 100 may include a host 102 and a memory system 110. The memory system 110 may be an example of the memory systems 110A, 110B and 110C described with reference to FIG. 1.

The host 102 may include any of various electronic devices, for example, portable electronic devices such as a mobile phone, MP3 player and laptop computer or electronic devices such as a desktop computer, game machine, TV and projector. That is, the host 102 may include wireless/wired electronic devices.

The host 102 may include one or more operating systems (OS), and the OS may manage and control overall functions and operations of the host 102, and provide an interactive operation between the host 102 and a user who uses the data processing system 100 or the memory system 110. The OS may support functions and operations corresponding to the intended use of the user. For example, the OS may be divided into a general OS and a mobile OS, depending on the mobility of the host 102. The general OS in the OS may be divided into a personal OS and an industrial OS, depending on the use environment of the user. For example, the personal OS which is specialized to support a service providing function for general users may include Windows, Chrome and the like, and the industrial OS which tis is specialized to secure and support high performance may include Windows Server, Linux, Unix, and the like. Furthermore, the mobile OS which is specialized to support a mobile service providing function and a system power-saving function for users may include Android, iOS, Windows Mobile, and the like. The host 102 may include a plurality of OSs, and execute an OS to perform an operation with the memory system 110 according to a user request. The host 102 may transfer a plurality of commands corresponding to the user request to the memory system 110, and thus the memory system 110 may perform operations corresponding to the commands, i.e. operations corresponding to the user request.

The memory system 110 may operate in response to a request of the host 102. In particular, the memory system 110 may store data accessed by the host 102. In other words, the memory system 110 may be used as a main memory device or secondary memory device of the host 102. The memory system 110 may be implemented as any of various types of storage devices, according to a host interface protocol coupled to the host 102. For example, the memory system 110 may be implemented as any of various types of storage devices including a solid state drive (SSD), a multi media card (MMC) such as an embedded MMC (eMMC), reduced size MMC (RS-MMC) or micro-MMC, a secure digital (SD) card such as a mini-SD or micro-SD, a universal storage bus (USB) storage device, a universal flash storage (UFS) device, a compact flash (CF) card, a smart media card and a tis memory stick.

The storage devices for implementing the memory system 110 may be configured as any of various volatile memory devices such as a dynamic random access memory (DRAM) and static RAM (SRAM) and nonvolatile memory devices such as a read only memory (ROM), mask ROM (MROM), programmable ROM (PROM), erasable programmable ROM (EPROM), electrically erasable programmable ROM (EEPROM), ferromagnetic RAM (FRAM), phase-change RAM (PRAM), magnetic RAM (MRAM), resistive RAM (RRAM) and flash memory.

The memory system 110 may include a memory device 150 for storing data accessed by the host 102 and a controller 130 for controlling data storage into the memory device 150.

The controller 130 and the memory device 150 may be integrated into one semiconductor device. For example, the controller 130 and the memory device 150 may be integrated into one semiconductor device to constitute an SSD. When the memory system 110 is used as the SSD, the operating speed of the host 102 coupled to the memory system 110 may be further improved. In other embodiment, the controller 130 and the memory device 150 may be integrated into one semiconductor device to constitute a memory card, such as a personal computer memory card international association (PCMCIA) card, a compact flash (CF) card, a smart media (SM) card, a memory stick, a multimedia card (MMC) such as RS-MMC or micro-MMC, an SD card such as mini-D, micro-SD or SDHC, and/or a universal tis flash storage (UFS) device.

For another example, the memory system 110 may constitute a computer, a ultra mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a potable game machine, a navigation system, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage constituting a data center, a device capable of transmitting/receiving information in a wireless environment, one of various electronic devices constituting a home network, one of various electronic devices constituting a computer network, one of various electronic devices constituting a telematics network, a radio frequency identification (RFI) device or one of various components constituting a computing system.

The memory device 150 of the memory system 110 may retain data stored therein even though no power is supplied. In particular, the memory device 150 may store data provided from the host 102 through a write operation, and provide data stored therein to the host 102 through a read operation. The memory device 150 may include a plurality of memory blocks 152, 154 and 156, each of which may include a plurality of pages, and each of the pages may include a plurality of memory cells to which a plurality of word lines WL are coupled. Furthermore, the memory device 150 may include a plurality of planes in which the plurality of memory blocks 152, 154 and 156 are disposed. In particular, the memory device 150 may include a plurality of memory dies in which the plurality of planes are disposed. The memory device 150 may be implemented as a nonvolatile memory device, for example, a flash memory. The flash memory may have a three-dimensional (3D) stack structure.

The controller 130 in the memory system 110 may control the memory device 150 in response to a request from the host 102. For example, the controller 130 may provide data read from the memory device 150 to the host 102, and store data provided from the host 102 in the memory device 150. For this operation, the controller 130 may control read, write, program and erase operations of the memory device 150.

More specifically, the controller 130 may include a host interface (I/F) 132, a processor 134, an error correction code component (ECC) 138, a power management unit (PMU) 140, a memory I/F 142 and a memory 144.

The host I/F 132 may be configured to process a command and data of the host 102, and communicate with the host 102 through one or more of various interface protocols, such as USB, MMC, PCI-E (Peripheral Component Interconnect-Express), SAS (Serial-attached SCSI), SATA (Serial Advanced Technology Attachment), PATA (Parallel tis Advanced Technology Attachment), SCSI (Small Computer System Interface), ESDI (Enhanced Small Disk Interface), IDE (Integrated Drive Electronics) and/or MIPI (Mobile Industry Processor Interface). The host I/F 132, through which data are exchanged with the host 102, may be driven through firmware referred to as a host interface layer (HIL).

The ECC 138 may correct an error bit of data processed by the memory device 150, and include an ECC encoder and an ECC decoder. The ECC encoder may generate data with a parity bit by performing error correction encoding on data to be programmed to the memory device 150, and the data with the parity bit may be stored in the memory device 150. When the data stored in the memory device 150 is read, the ECC decoder may detect and correct an error contained in the data read from the memory device 150. In other words, the ECC 138 may perform error correction decoding on the data read from the memory device 150, determine whether the error correction decoding was successfully performed, output an indication signal, for example, an error correction success/fail signal according to the determination result, and correct error bits of the read data using the parity bit generated in the error correction encoding process. When the number of error bits is greater than or equal to a threshold for the number of correctable error bits, the ECC 138 cannot correct the error bits, and instead outputs the error correction fail signal indicating that the ECC 138 failed to correct the error bits.

The ECC 138 may perform error correction using a low density parity check (LDPC) code, a Bose, Chaudhri, Hocquenghem (BCH) code, a turbo code, a Reed-Solomon code, a convolution code, a recursive systematic code (RSC), or coded modulation such as trellis-coded modulation (TCM) or block coded modulation (BCM), and is not limited thereto. The ECC 138 may include any and all circuits, modules, systems or devices for error correction.

The PMU 140 may provide and manage power of the controller 130. That is, the PMU 140 may provide and manage power of the components included in the controller 130.

The memory I/F 142 may serve as a memory/storage I/F to interface the controller 130 and the memory device 150, such that the controller 130 controls the memory device 150 in response to a request from the host 102. When the memory device 150 is a flash memory, for example, a NAND flash memory, the memory I/F 142 may serve as a NAND flash controller (NFC), and generate a control signal of the memory device 150 and process data of the memory device 150 under control of the processor 134. The memory I/F 142 may support an operation of an interface for processing a command and data between the controller 130 and the memory device 150, for example, a NAND flash interface. In particular, the memory I/F 142 may support data input/output between the controller 130 and the memory device 150, and serve as a region to exchange data with the memory device 150. The memory I/F 142 may be driven through firmware referred to as a tis flash interface layer (FIL).

The memory 144 may serve as a working memory of the memory system 110 and the controller 130, and store data for driving the memory system 110 and the controller 130. More specifically, when the controller 130 controls the memory device 150 in response to a request from the host 102, for example, when the controller 130 controls read, write, program and erase operations of the memory device 150 in order to provide data read from the memory device 150 to the host 102 and to store data provided from the host 102 in the memory device 150, the memory 144 may store data required for performing such operations on the memory system 110, i.e. between the controller 130 and the memory device 150.

The memory 144 may be implemented as a volatile memory. For example, the memory 144 may be implemented as a static random access memory (SRAM) or a dynamic random access memory (DRAM). As illustrated in FIG. 1, the memory 144 may be disposed with or externally to the controller 130. For example, the memory 144 may be implemented as an external volatile memory to which data is inputted from the controller 130 or from which data is outputted to the controller, through the memory I/F.

As described above, the memory 144 may store data required for performing a data write/read operation between the host 102 and the memory device 150 and data when the data write/read operation is performed. In order to store such data, the memory 144 may tis include a program memory, a data memory, a write buffer/cache, a read buffer/cache, a data buffer/cache, a map buffer/cache, and the like.

The processor 134 may control overall operations of the memory system 110. In particular, the processor 134 may control a program operation or read operation on the memory device 150 in response to a write request or read request from the host 102. The processor 134 may drive firmware referred to as a flash translation layer (FTL), in order to control overall operations of the memory system 110. The processor 134 may be implemented as a microprocessor and/or a central processing unit (CPU).

For example, the controller 130 may perform an operation requested by the host 102 in the memory device 150 through the processor 134. In other words, the controller 130 may perform a command operation corresponding to a command received from the host 102 with the memory device 150. In this case, the controller 130 may perform a foreground operation as a command operation corresponding to the command received from the host 102, for example, a program operation corresponding to a write command, a read operation corresponding to a read command, an erase operation corresponding to an erase command, or a parameter set operation corresponding to a set parameter command or set feature command as a set command.

The controller 130 may perform a background operation on the tis memory device 150 through the processor 134. The background operation on the memory device 150 may include copying data stored in an arbitrary memory block among the memory blocks 152, 154 and 156 of the memory device 150 into another arbitrary memory block, for example, a garbage collection (GC) operation, an operation of swapping data stored in the memory blocks 152, 154 and 156, for example, a wear leveling (WL) operation, an operation of storing map data stored in the controller 130 into the memory blocks 152, 154 and 156 of the memory device 150, for example, a map flush operation, or an operation of performing bad management on the memory device 150, for example, a bad block management operation of checking and processing a bad block in the memory blocks 152, 154 and 156 included in the memory device 150.

In the memory system in accordance with an embodiment, when the controller 130 performs a plurality of command operations corresponding to a plurality of commands received from the host 102, for example, a plurality of program operations corresponding to a plurality of write commands, a plurality of read operations corresponding to a plurality of read commands, and a plurality of erase operations corresponding to a plurality of erase commands in the memory device 150, the controller 130 may decide the best channels or ways among a plurality of channels or ways coupled to the plurality of memory dies included in the memory device 150, and then transmit the commands received from the host 102 to corresponding memory tis dies through the best channels or ways. Furthermore, the controller 130 may receive performance results of command operations from the memory dies which have performed the command operations corresponding to the commands, through the best channels or ways, and then provide the performance results of the command operations to the host 102. In particular, when a plurality of commands are received from the host 102 in the memory system, the controller 130 may check the states of the plurality of channels or ways, decide the best transmitting channels or ways in response to the states of the plurality of channels or ways, and transmit the plurality of commands received from the host 102 to the corresponding memory dies through the best transmitting channels or ways. Furthermore, after the command operations corresponding to the plurality of commands received from the host 102 are performed in the memory dies of the memory device 150, the controller 130 may receive the performance results of the command operations from the memory dies of the memory device 150 through the best receiving channels or ways decided in response to the states of the channels or ways, and provide the host 102 with the performance results received from the memory dies as responses to the plurality of commands received from the host 102.

The controller 130 may check the states of the plurality of channels or ways coupled to the plurality of memory dies included in the memory device 150, for example, busy states, ready states, active tis states, idle states, normal states or abnormal states of the channels or ways, and then transmit the plurality of commands received from the host 102 to the corresponding memory dies through the best channels or ways decided in response to the states of the channels or ways. In other words, the controller 130 may transmit requests to the corresponding memory dies through the best transmitting channels or ways, in order to request the memory dies to perform the command operations corresponding to the plurality of commands received from the host 102. Furthermore, the controller 130 may receive the performance results of the command operations from the corresponding memory dies in response to the requests for the command operations through the best transmitting channels or ways. The controller 130 may receive the performance results of the command operations through the best channels or ways decided in response to the states of the channels or ways, that is, the best receiving channels or ways. Furthermore, the controller 130 may match a descriptor of the commands transmitted through the best transmitting channels or ways with a descriptor of the performance results received through the best receiving channels or ways, and then provide the host 102 with the performance results of the command operations corresponding to the commands received from the host 102.

The descriptor of the commands may include data information or position information corresponding to the commands and identification information of the transmitting channels or ways through which the commands are transmitted. The data information or position information may include addresses of data corresponding to write commands or read commands (for example, logical page numbers of the data) or addresses of the positions where the data are stored (for example, physical page information of the memory device 150), and the identification information may include identifiers of the transmitting channels or ways through which the commands are transmitted (for example, channel numbers or way numbers). The descriptor of the performance results may include data information or position information corresponding to the performance results and identification information of the channels or ways through which the command operations are requested, i.e. the transmitting channels or ways through which the commands are transmitted. The data information or position information may include addresses of data of program operations corresponding to write commands or data of read operations corresponding to read commands (for example, logical page numbers of the data) or addresses of the positions where the program operations or the read operations are performed (for example, physical page information of the memory device 150), and the identification information may include identifiers of the transmitting channels or ways (for example, channel numbers or way numbers). Furthermore, the information included in the descriptor of the commands and the descriptor of the performance results, for example, the data information, the position information or the identification information of tis the channels or ways may be included as contexts or tags in the descriptors.

That is, the memory system 110 in accordance with an embodiment may transmit/receive the plurality of commands received from the host 102 and the performance results of the plurality of command operations corresponding to the commands through the best channels or ways among the plurality of channels coupled to the memory dies of the memory device 150. In particular, the memory system 110 may independently manage the transmitting channels or ways through which the commands are transmitted to the memory dies of the memory device 150 and the receiving channels or ways through which the performance results of the command operations are received from the memory dies of the memory device 150, in response to the states of the plurality of channels or ways coupled to the memory dies of the memory device 150. For example, the controller 130 of the memory system 10 may decide, as the independent best channels or ways, a transmitting channel or way through which a first command is transmitted and a receiving channel or way through which a performance result of a first command operation corresponding to the first command is received, among the plurality of channels or ways, in response to the states of the plurality of channels or ways. For example, the controller 130 may decide the transmitting channel or way as the first best channel or way, decide the receiving channel or way as the first best channel or way or the second best channel or way, and tis perform the transmitting of the first command and the receiving of the performance result of the first command operation through the independent best channels or ways, respectively.

Therefore, the memory system 110 in accordance with an embodiment may use the plurality of channels or ways coupled to the plurality of dies of the memory device 150 more efficiently. In particular, the memory system 110 may transmit and receive the plurality of commands received from the host 102 and the performance results of the command operations corresponding to the commands through the best channels or ways, respectively, which makes it possible to further improve the operation performance of the memory system 110. In an embodiment described below, it is exemplified that a plurality of commands received from the host 102 and performance results of command operations corresponding to the commands are transmitted and received through the plurality of channels or ways for the memory dies included in the memory device 150 of the memory system 110. However, the teachings may be applied in the same manner to the case in which each of a plurality of memory systems each including the controller 130 and the memory device 150 transmits/receives a plurality of commands received from the host 102 and performance results of command operations corresponding to the commands through a plurality of channels or ways for each of the memory systems. Furthermore, when a plurality of commands are received from the host 102, the memory system may transmit the tis plurality of commands, perform command operations corresponding to the plurality of commands, and transmit performance results of the command operations. This process is described in more detail with reference to FIGS. 5 to 9. Therefore, detailed description thereof is omitted here.

The processor 134 of the controller 130 may include a management unit (not illustrated) for performing bad block management of the memory device 150, and the management unit may check bad blocks among the plurality of memory blocks 152, 154 and 156 included in the memory device 150, and then perform bad block management to process the checked bad blocks. The bad block management may be performed as follows. When the memory device 150 is a flash memory, for example, a NAND flash memory, a program fail may occur during a data write operation, for example, a data program operation, due to the characteristics of the NAND flash memory. In this case, the processor 134 may mark a memory block where the program fail occurred, as a bad block, and then write or program data, which failed to be programmed, to a new memory block. Furthermore, the existence of a bad block in the memory device 150 having a 3D stack structure as described above may rapidly degrade the use efficiency of the memory device 150 and the reliability of the memory system 110. Therefore, bad block management needs to be more reliably performed.

Figure 4:
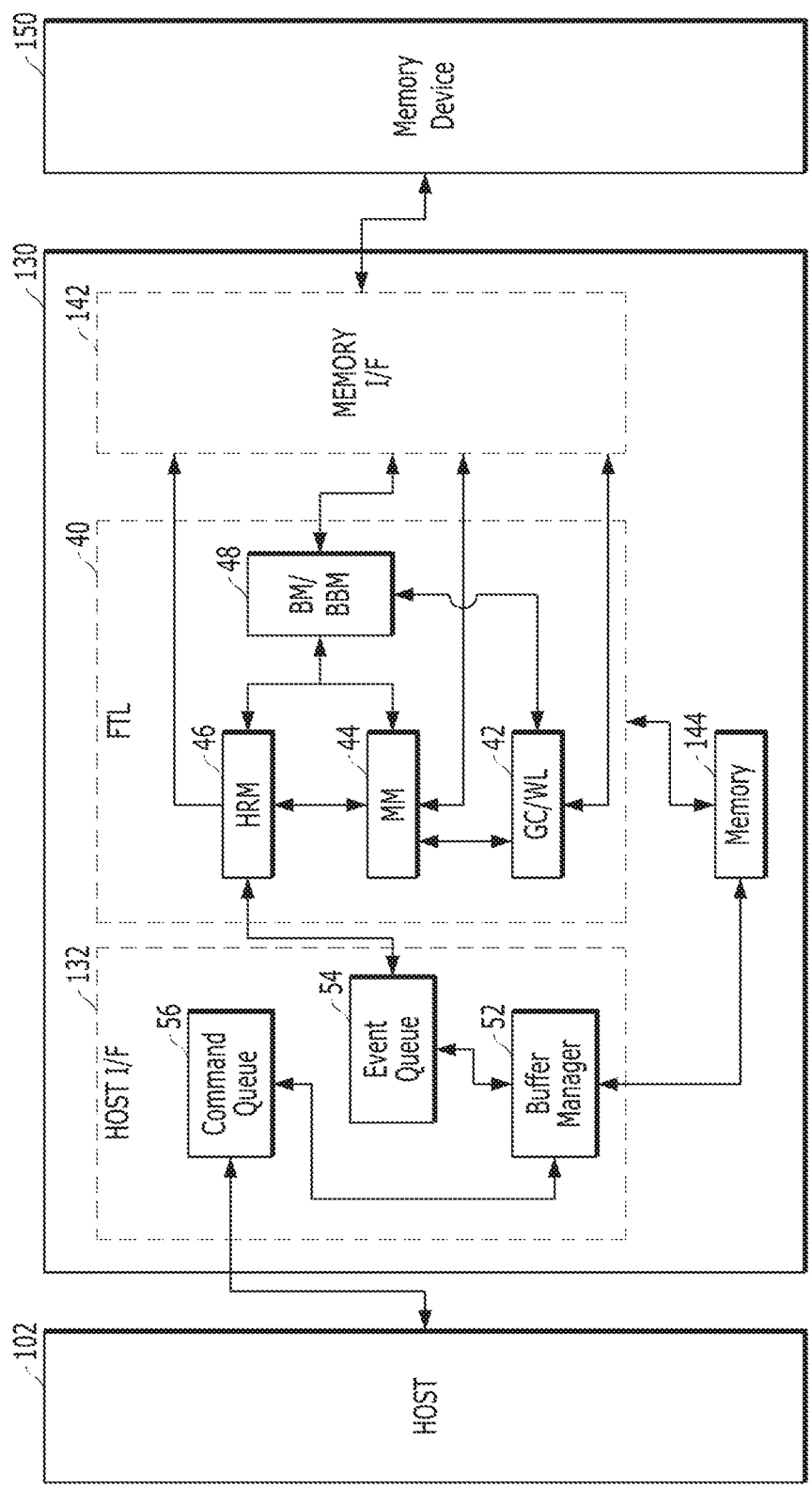
FIG. 4 is a diagram illustrating a controller within a memory system in accordance with an embodiment.

FIG. 4 is a diagram illustrating a controller within a memory system in accordance with an embodiment.

Referring to FIG. 4, a controller 130 which interworks with a host 102 and a memory device 150 may include a host I/F 132, an FTL 40, a memory I/F 142 and a memory 144. The controller 130 illustrated in FIG. 4 is an example of the controller 130 included in the plurality of memory systems 110A, 110B and 110C described with reference to FIG. 1.

Although not illustrated in FIG. 4, the ECC 138 described with reference to FIG. 3 may be included in the FTL 40 depending on embodiments. In an embodiment, the ECC 138 may be implemented as a separate module, circuit or firmware within the controller 130.

The host I/F 132 may serve to exchange a command and data transferred from the host 102. For example, the host I/F 132 may include a command queue 56, a buffer manager 52 and an event queue 54. The command queue 56 may sequentially store commands and data transferred from the host 102, and then output the commands and data according to the order in which the commands or data are stored. The buffer manager 52 may classify the commands and data transferred from the command queue 56 or adjust the order in which the commands and data are to be processed. The event queue 54 may sequentially transfer events for processing the commands and data transferred from the buffer manager 52.

From the host 102, a plurality of commands and data having the same characteristic may be consecutively transferred, or a plurality of commands and data having different characteristics may be mixed and transferred. For example, a plurality of commands for reading data may be transferred, or read and program commands may be alternately transferred. The host I/F 132 may sequentially store the commands and data transferred from the host 102 into the command queue 56. Then, the host I/F 132 may predict which operation the controller 130 will perform, based on the characteristics of the commands and data transferred from the host 102, and decide the processing order or priority of the commands and data, based on the prediction. Furthermore, according to the characteristics of the commands and data transferred from the host 102, the buffer manager 52 within the host I/F 132 may decide whether to store the commands and data in the memory 144 or to transfer the commands and data to the FTL 40. The event queue 54 may receive, from the buffer manager 52, events which the memory system or the controller 130 needs to internally process or perform according to the commands and data transferred from the host 102, and then transfer the received events to the FTL 40 according to the order in which the events are received.

In an embodiment, the FTL 40 may include a host request manager (HRM) 46 for managing events received from the event queue 54, a map manager (MM) 44 for managing map data, a state manager 42 for performing garbage collection or wear leveling, and a block manager 48 for executing a command in a block within the memory device.

For example, the HRM 46 may process a request according to read and program commands and an event which are received from the host I/F 132, using the MM 44 and the block manager 48. The HRM 46 may transfer an inquiry request to the MM 44 to recognize a physical address corresponding to a logical address of the transferred request, and transfer a flash read request for the physical address to the memory I/F 142 to process the read request. The HRM 46 may transfer a program request to the block manager 48 to program data to a specific page of the memory device 150, where no data are written or which has no data, and then transfer a map update request for the program request to the MM 44 to update the contents of the programmed data into logical-physical address mapping information.

The block manager 48 may convert program requests of the HRM 46, the MM 44 and the state manager 42 into program requests for the memory device 150, in order to manage the blocks within the memory device 150. In order to maximize the program or write performance of the memory system 110 (see FIG. 2), the block manager 48 may collect program requests, and transfer a flash program request for a multi-plane and one-shot program operation to the memory I/F 142. Furthermore, in order to maximize the parallel processing performance of a multi-channel and multi-direction flash controller, the block manager 48 may transfer various flash program requests to the memory I/F 142.

The block manager 48 may manage flash blocks according to tis valid page counts, select and erase a block with no valid pages when a free block is needed, and select a block including the smallest number of valid pages when garbage collection is needed. In order for the block manager 48 to have a sufficient number of empty blocks, the state manager 42 may collect valid data by performing garbage collection, move the collected valid data to an empty block, and erase the blocks in which the valid data was stored. When the block manager 48 provides the state manager 42 with information on a block to be erased, the state manager 42 may check all flash pages of the block to be erased, and then determine whether the pages are valid. For example, in order to determine whether each of the pages is valid, the state manager 42 may identify a logical address recorded in a spare region or out-of-band (OOB) region of the page, and then compare the actual address of the page to an actual address mapped to a logical address which is acquired through an inquiry request of the MM 44. The state manager 42 may transfer a program request for each of the valid pages to the block manager 48. When the program operation is completed, a mapping table may be updated through an update operation of the MM 44.

The MM 44 may manage a logical-physical mapping table, and process inquiry and update requests generated by the HRM 46 and the state manager 42. The MM 44 may store the entire mapping table in a flash memory, and cache mapping items depending on the capacity of the memory 144. When a map cache miss occurs while the inquiry tis and update requests are processed, the MM 44 may transfer a read request to the memory I/F 142 to load the mapping table stored in the memory device 150. When the number of dirty cache blocks in the MM 44 exceeds a threshold value, the MM 44 may transfer a program request to the block manager 48 to make a clean cache block, and store a dirty map table in the memory device 150.

While the state manager 42 copies a valid page when garbage collection is performed, the HRM 46 may program the latest version of data for the same logical address of the page, and simultaneously issue an update request. When the state manager 42 requests map update in a state where the copying of the valid page is not properly completed, the MM 44 may not perform mapping table update. Only when the latest map table still indicates the previous actual address, the MM 44 may perform map update to guarantee accuracy.

The memory device 150 may include a plurality of memory blocks, which may be single level cell (SLC) memory blocks or multi-level cell (MLC) memory blocks, depending on the number of bits which can be stored or expressed in one memory cell. The SLC memory block may include a plurality of pages implemented by memory cells each capable of storing one-bit data therein. SLC blocks have excellent data operation performance and high durability. The MLC memory block may include a plurality of pages implemented by memory cells each capable of storing multi-bit data therein. An MLC block has a larger data storage space than a SLC memory block. In other words, the MLC memory block may be highly integrated. In particular, the memory device 150 may include, as the MLC memory block, a triple level cell (TLC) memory block including a plurality of pages implemented by memory cells each capable of storing three-bit data therein, a quadruple level cell (QLC) memory block including a plurality of pages implemented by memory cells each capable of storing four-bit data therein, or a multiple level cell memory block including a plurality of pages implemented by memory cells each capable of storing five or more-bit data therein, as well as the MLC memory block including a plurality of pages implemented by memory cells each capable of storing two-bit data therein.

While it is exemplified that the memory device 150 is implemented as a nonvolatile memory such as a flash memory, for example, a NAND flash memory, this is merely an example. More generally, the memory device 150 may be implemented as any one of various types of memories such as a phase change random access memory (PCRAM), a resistive random access memory (RRAM or ReRAM), a ferroelectric random access memory (FRAM) and/or a spin transfer torque magnetic random access memory (STT-RAM or STT-MRAM).

In an embodiment, the controller 130 in the memory system 110 may check the states of a plurality of channels or ways for the memory device 150 or specifically channels or ways between the controller 130 and a plurality of memory dies in the memory device tis 150. Alternatively, a controller of an arbitrary memory system among a plurality of memory systems, for example, a master memory system, may check the states of a plurality of channels or ways for the plurality of memory systems or specifically channels or ways between the master memory system and the other memory systems, for example, channels or ways between the master memory system and slave memory systems. In other words, the controller 130 may check whether each of the plurality of channels or ways for the memory dies of the memory device 150 or each of the plurality of channels or ways for the plurality of memory systems is busy, ready, active, idle, normal or abnormal. In an embodiment, the controller 130 may decide that ready or idle channels or ways in a normal state are the best channels or ways. In particular, the controller 130 may decide, as the best channels or ways, channels or ways of which the available capacities fall within a normal range or channels or ways of which the operation levels fall within a normal range. The operation level of each channel or way may be decided by an operation dock, a power level, a current/voltage level, operation timing, a temperature level or the like in the channel or way.

In an embodiment, the case in which write data corresponding to a plurality of write commands received from the host 102 are stored in a buffer/cache in the memory 144 of the controller 130, the data stored in the buffer/cache are programmed and stored into a plurality of memory blocks in the memory device 150 through program tis operations, map data are updated in response to the program operations for the memory device 150, and the updated map data are stored in the plurality of memory blocks, that is, the case in which the program operations corresponding to the plurality of write commands received from the host 102 are performed is described as an example. Furthermore, the case in which map data of data corresponding to a plurality of read commands for data stored in the memory device 150 are checked when the plurality of read commands are received from the host 102, the data corresponding to the read commands are read from the memory device 150, the read data are stored in the buffer/cache included in the memory 144 of the controller 130, and the data stored in the buffer/cache are provided to the host 102, that is, the case in which read operations corresponding to the plurality of read commands received from the host 102 are performed is described as an example. Furthermore, the case in which memory blocks corresponding to a plurality of erase commands for the memory blocks in the memory device 150 are checked when the plurality of erase commands are received from the host 102, data stored in the checked memory blocks are erased, map data are updated in response to the erased data, and the updated map data are stored in the plurality of memory blocks included in the memory device 150, that is, the case in which erase operations corresponding to the plurality of erase commands received from the host 102 are performed is described as an example. Furthermore, the case in which a plurality of write tis commands, a plurality of read commands and a plurality of erase commands are received from the host 102 and a plurality of program operations, a plurality of read operations and a plurality of erase operations are performed is described as an example.

By way of example, it is described that command operations in the memory system 110 are performed by the controller 130. As described above, however, the processor 134 in the controller 130 may perform the command operations through the FTL, for example. For example, the controller 130 may program and store user data and meta data, corresponding to write commands received from the host 102, into arbitrary memory blocks of the plurality of memory blocks included in the memory device 150, read user data and meta data, corresponding to read commands received from the host 102, from arbitrary memory blocks of the plurality of memory blocks in the memory device 150 and provide the read data to the host 102, or erase user data and meta data, corresponding to erase commands received from the host 102, from arbitrary memory blocks of the plurality of memory blocks included in the memory device 150.

The meta data may include first map data including logical to physical (L2P) information on data stored in memory blocks and second map data including physical to logical (P2L) information, in response to a program operation. Hereafter, the L2P information will be referred to as 'logical information', and the P2L information will be referred to as 'physical information'. The meta data may further include information on command data corresponding to a command received from the host 102, information on a command operation corresponding to the command, information on memory blocks of the memory device 150 where the command operation is performed, and information on map data corresponding to the command operation. In other words, the meta data may include all of the other pieces of information and the other data except the user data corresponding to the command received from the host 102.

That is, in an embodiment, the controller 130 may perform command operations corresponding to a plurality of commands received from the host 102. For example, when a plurality of write commands are received from the host 102, the controller 130 may perform program operations corresponding to the write commands. The controller 130 may write and store user data corresponding to the write commands into memory blocks of the memory device 150, for example, empty memory blocks, open memory blocks or free memory blocks where erase operations have been performed, among the memory blocks. Furthermore, the controller 130 may write and store first map data and second map data into empty memory blocks, open memory blocks or free memory blocks among the memory blocks the memory device 150. The first map data may include an L2P map table or L2P map list in which mapping information between logical addresses for the user data stored in the memory blocks and physical addresses, i.e. logical information is recorded, and the second map data may include a P2L map table or P2L map list in which mapping information between physical addresses of the memory blocks having the user data stored therein and logical addresses, i.e. physical information is recorded.

When write commands are received from the host 102, the controller 130 may write and store user data corresponding to the write commands into memory blocks, and store meta data in the memory blocks, the meta data including first and second map data for the user data stored in the memory blocks. In particular, when data segments of the user data are stored in the memory blocks of the memory device 150, the controller 130 may generate and update L2P segments of the first map data and P2L segments of the second map data as map segments of meta data, i.e. map segments of map data, and then store the map segments in the memory blocks of the memory device 150. The controller 130 may load the map segments stored in the memory blocks of the memory device 150 to the memory 144 included in the controller 130, and update the map segments.

In an embodiment, when a plurality of write commands are received from the host 102, the controller 130 may check the states of the plurality of channels or ways for the memory device 150 or specifically the states of the plurality of channels or ways coupled to the plurality of memory dies included in the memory device 150, and then decide the best transmitting channels or ways and the best receiving channels or ways independently of one another, in response tis to the states of the channels or ways. In an embodiment, the controller 130 may perform program operations by transferring and storing user data and meta data corresponding to the write commands into the corresponding memory dies of the memory device 150 through the best transmitting channels or ways. Furthermore, the controller 130 may receive performance results of the program operations in the corresponding memory dies of the memory device 150 from the corresponding memory dies of the memory device 150 through the best receiving channels or ways, and provide the received performance results to the host 102.

When a plurality of read commands are received from the host 102, the controller 130 may perform read operations corresponding to the plurality of read commands by reading read data corresponding to the read commands from the memory device 150, storing the read data in the buffer/cache included in the memory 144 of the controller 130, and then providing the data stored in the buffer/cache to the host 102.

In an embodiment, when a plurality of read commands are received from the host 102, the controller 130 may check the states of the plurality of channels or ways for the memory device 150 or specifically the states of the plurality of channels or ways coupled to the plurality of memory dies included in the memory device 150, and then decide the best transmitting channels or ways and the best receiving channels or ways independently of one another, in response to the states of the channels or ways. In an embodiment, the tis controller 130 may perform read operations by transferring read requests for user data and meta data corresponding to the read commands to the corresponding memory dies of the memory device 150 through the best transmitting channels or ways. Furthermore, the controller 130 may receive performance results of the read operations in the corresponding memory dies of the memory device 150, Le, the user data and meta data corresponding to the read commands, from the memory dies of the memory device 150 through the best receiving channels or ways, and provide the user data to the host 102.

When a plurality of erase commands are received from the host 102, the controller 130 may check memory blocks of the memory device 150, corresponding to the erase commands, and then perform erase operations on the memory blocks.

In an embodiment, when a plurality of erase commands are received from the host 102, the controller 130 may check the states of the plurality of channels or ways for the memory device 150 or specifically the states of the plurality of channels or ways coupled to the plurality of memory dies included in the memory device 150, and then decide the best transmitting channels or ways and the best receiving channels or ways independently one another, in response to the states of the channels or ways. Furthermore, in an embodiment, the controller 130 may perform erase operations by transferring an erase request for memory blocks in memory dies of the memory device 150, corresponding to the erase commands, to the corresponding memory dies of the memory device 150 through the best transmitting channels or ways. Then, the controller 130 may receive performance results of the erase operations in the corresponding memory dies of the memory device 150 from the memory dies of the memory device 150 through the best receiving channels or ways, and provide the performance results to the host 102.

When a plurality of commands, i.e. a plurality of write commands, a plurality of read commands and a plurality of erase commands are received from the host 102, or specifically when the plurality of commands are sequentially received, the memory system 110 may check the states of the plurality of channels or ways for the memory device 150, decide the best transmitting channels or ways and the best receiving channels or ways independently one another in response to the states of the channels or ways, request the memory device 150 to perform command operations corresponding to the plurality of commands through the best transmitting channels or ways or specifically request the plurality of memory dies included in the memory device 150 to perform the corresponding command operations, and receive performance results of the command operations from the memory dies of the memory device 150 through the best receiving channels or ways. The memory system 110 may match the commands transferred through the best transmitting channels or ways with the performance results received through the best receiving channels or ways, and provide the host 102 with tis responses to the plurality of commands received from the host 102.

In an embodiment, the controller 130 included in the memory system 110 may check the states of the plurality of channels or ways for the memory device 150 of the memory system 110 or specifically the states of the channels or ways between the controller 130 and the plurality of memory dies included in the memory device 150, and then decide the best transmitting channels or ways and the best receiving channels or ways for the memory device 150 independently of one another. Furthermore, the controller of an arbitrary memory system among the plurality of memory systems, for example, a master memory system, may check the states of the plurality of channels or ways for the plurality of memory systems or specifically the states of the channels or ways between the master memory system and the other memory systems, for example, the master memory system and the slave memory systems, and then decide the best transmitting channels or ways and the best receiving channels or ways for the memory systems independently of one another. In other words, in an embodiment, the controller 130 may check whether the plurality of channels or ways for the memory dies of the memory device 150 or the plurality of channels or ways for the plurality of memory systems are busy, ready, active, idle, normal or abnormal. For example, the controller 130 may decide ready or idle channels or ways in a normal state as the best channels or ways. In particular, the controller 130 may decide, as the best channels or ways, channels or ways of which the available capacities fall within a normal range or channels or ways of which the operation levels fall within a normal range, among the plurality of channels or ways. The operation level of each channel or way may be decided by an operation clock, a power level, a current/voltage level, operation timing, a temperature level or the like in the channel or way. Furthermore, in an embodiment, the master memory system may be decided among the plurality of memory systems based on the information of the respective memory systems, for example, capability for command operations (e.g. performance capability for command operations), process capability, process speed and process latency in the controller 130 and the memory device 150 included in each of the memory systems. The master memory system may be decided through competition among the plurality of memory systems. For example, the master memory system may be decided through competition based on the connection order between the host 102 and the respective memory systems.

Figure 5:
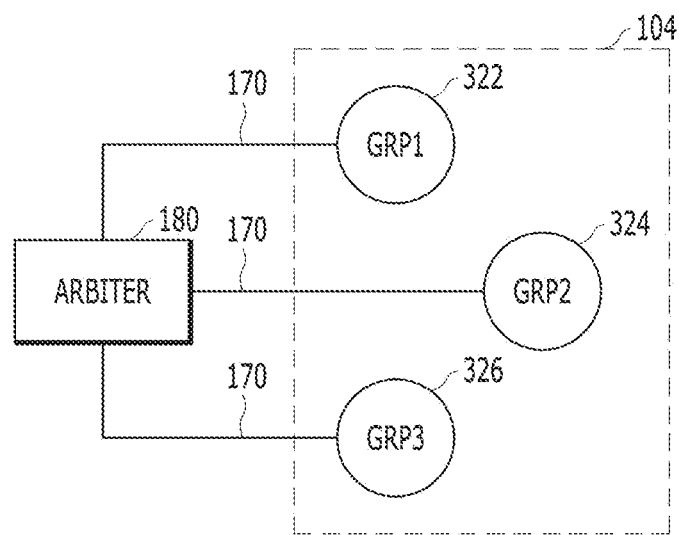
FIG. 5 is a diagram illustrating data path allocation between an arbiter and a plurality of groups obtained by dividing a plurality of resources in the data processing system in accordance with an embodiment.

FIG. 5 is a diagram illustrating data path allocation between the arbiter and a plurality of groups obtained by dividing the plurality of resources in the data processing system in accordance with an embodiment.

Referring to FIG. 5, the arbiter 180 and the plurality of resources 104 may be coupled through a plurality of data paths 170. The plurality of resources 104 may be divided into a plurality of groups 322, 324 and 326. Specifically, the arbiter 180 may be coupled to each of the groups 322, 324 and 326 through one or more data paths 170.

In an embodiment, the plurality of resources in each of the groups 322, 324 and 326 may be coupled to the arbiter 180 through a plurality of data paths. For example, suppose that there are six data paths to couple the arbiter 180 and the plurality of resources 104 in the data processing system. The resources of the plurality of resources 104 may be coupled to the arbiter 180 through the six data paths. However, each of the resources may not perform data communication with the arbiter 180 by using all six data paths, but transmit/receive data through one or more of the six data paths. When a specific resource transmits/receives data through a first data path, another resource may transmit/receive data through a second data path. In this case, each of the resources needs to include a plurality of data transmitting/receiving modules corresponding to the respective data paths or a multiplexer for selecting at least one of the plurality of data paths, like the arbiter 180.

In an embodiment, although the data processing system includes the six data paths to couple the arbiter 180 to the plurality of resources 104, each of the resources may be coupled to the arbiter 180 through one or two data paths. The number of data paths that couple each of the resources to the arbiter 180 may be decided depending on the data input/output speed of the resource and the transfer rate of the data path. For example, when a first resource has a data input/output speed of 10M bps (bit/s) and the data path has a transfer rate of 5M tis bps, the first resource may be coupled to the arbiter 180 through two data paths.

FIG. 5 illustrates that the groups 322, 324 and 326 within the plurality of resources 104 are coupled to the arbiter 180 through the plurality of data paths 170. However, the plurality of data paths 170 described with reference to FIG. 5 may indicate conceptual data paths which are allocated among the plurality of data paths 170. For example, the resources in the first group 322 may be physically coupled to the arbiter 180 through 10 data paths, but only two data paths may be allocated to operably couple the resources in the first group 322 and the arbiter 180. That is, two data paths are allocated to the resources of the first group 322 among the 10 data paths. The other eight data paths among the 10 data paths may be allocated to the resources in the second or third group 324 or 326.

Each of the resources in the plurality of resources 104 may be physically coupled to the arbiter 180 through two or three data paths. For example, suppose that the number of data paths which are available for allocation by the arbiter 180 is 10, the number of resources is five, and each of the resources is physically coupled to the arbiter 180 through three data paths. In this case, when three data paths coupled to each of the resources are all added up, the total number of data paths is 15. However, since the number of data paths which can be allocated by the arbiter 180 is 10, the arbiter 180 may selectively allocate the 10 data paths for operable connection among the 15 physically coupled data paths, based on transmission statuses of data transmitted through the respective data paths. In order to raise the efficiency, the arbiter 180 may monitor the respective data transmission statuses for the 10 data paths or data transmission statuses for the five resources, and decide a resource to which each of the 10 data paths is to be allocated among the five resources. In this case, however, the operation of the arbiter 180 may become very complex, and overhead may increase.

In an embodiment, the five resources may be divided into a plurality of groups and the data paths may be allocated not on a resource basis but on a group basis (i.e., allocated not to the resources individually but to the groups). For example, two resources of the five resources may be placed in the first group 322, other two resources may be placed in the second group 324, and the remaining resource may be placed in the third group 326. Then, the arbiter 180 may check only the data transmission statuses of the respective groups and dynamically allocate the data paths on a group basis. For example, the arbiter 180 may basically allocate one data path to each of the three groups 322, 324 and 326, and then selectively allocate the other seven data paths to the three groups. The arbiter 180 does not need to monitor the use statuses of the respective data paths or the data transmission statuses of each of the resources individually. The arbiter 180 may selectively allocate the other data paths, excluding the data paths which are basically allocated to the respective groups, based only on the data transmission statuses of the respective groups.

In an embodiment, there may be no additionally available data paths which the arbiter 180 can allocate to the respective groups. For example, suppose that the plurality of resources 104 are divided into the three groups 322, 324 and 326, and the plurality of resources 104 and the arbiter 180 are physically coupled through three data paths 170. In this case, one data path may be allocated to each of the groups. If the data transmission statuses of the three data paths are significantly different, the arbiter 180 may rearrange resources in the three groups 322, 324 and 326. When the number of resources in each of the groups is rearranged, the data transmission loads of the groups may become more balanced. For example, although two resources of the five resources were included in the first group 322, another two resources of the five resources were included in the second group 324, and the remaining one resource was included in the third group 326, the arbiter 180 may rearrange the resources such that one resource belongs to the first group 322, another resource belongs to the second group 324, and the remaining three resources belong to the third group 326, based on the data transmission statuses of the original groups.

Figure 6A:
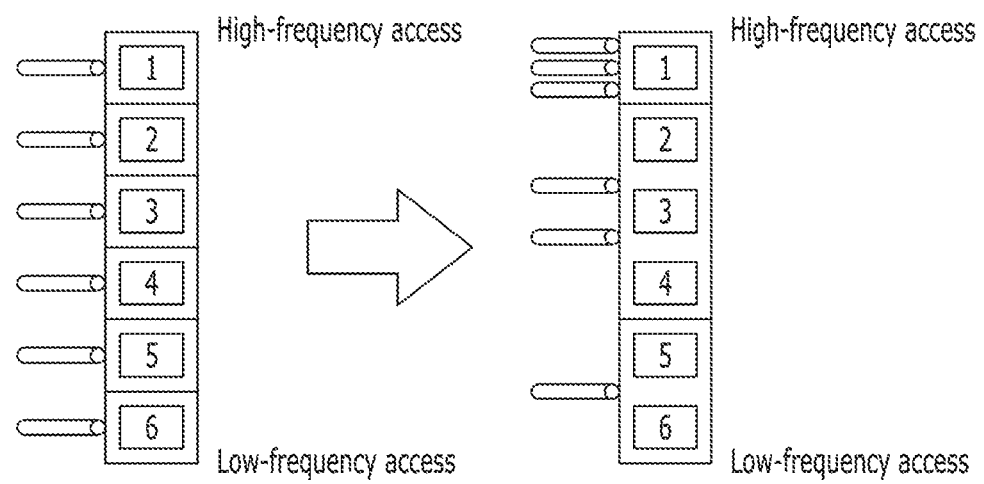
FIGS. 6A to 6C are diagrams illustrating an example in which the data processing system allocates data paths in accordance with an embodiment.
Figure 6B:
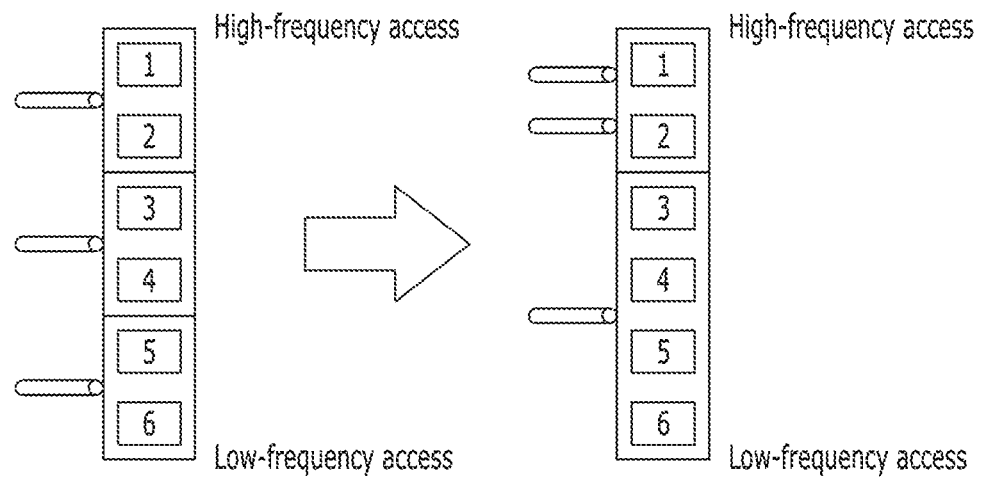
Figure 6C:
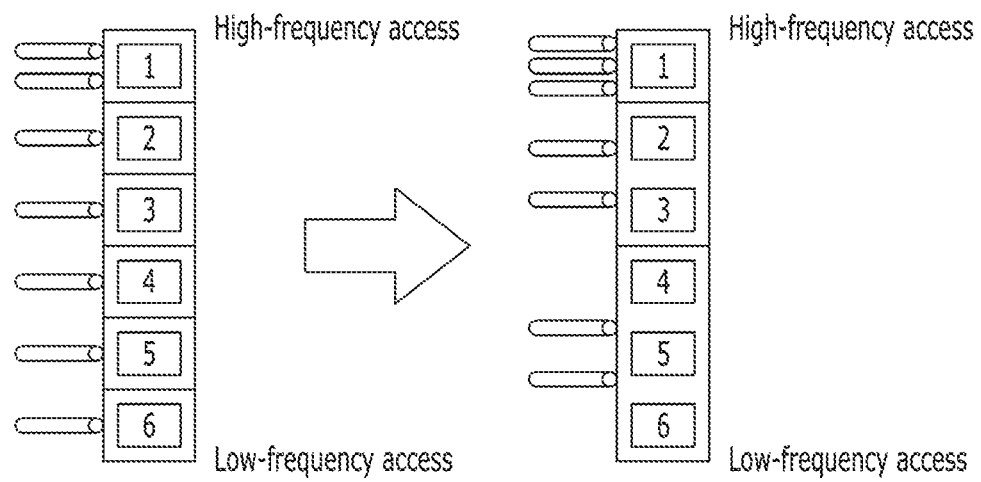

FIGS. 6A to 6C are diagrams illustrating examples in which the data processing system in accordance with an embodiment allocates data paths. Specifically, FIG. 6A illustrates the case in which the number of resources is equal to the number of data paths, FIG. 6B illustrates the case in which the number of resources is larger than the number of data paths, and FIG. 6C illustrates the case in which the number of resources is smaller than the number of data paths.

FIG. 6A is based on the supposition that the data processing system includes six resources and six data paths. At the initial stage of the operation of the data processing system, one data path may be allocated to each of the six resources. According to the data input/output statuses or data transmission statuses of the respective six resources, which are determined after a set time point, the access frequencies of the first to sixth resources may be decided in descending order. That is, the first resource may be accessed at the highest frequency, and the sixth resource may be accessed at the lowest frequency. The arbiter 180 (see FIG. 5) may group the first to sixth resources based on the access frequencies. Since the access frequency of the first resource is high, the first resource may be set to the first group, the second to fourth resources may be set to the second group, and the fifth and sixth resources may be set to the third group. Then, the arbiter 180 may allocate three data paths to the first group, allocate two data paths to the second group, and allocate one data path to the third group.

Here, the numbers of resources included in the respective groups may be different from one another, and the numbers of data paths allocated to the respective groups may be different from one another. In an embodiment, the number of resources included in each of the groups or the number of data paths allocated to each of the groups may be decided according to the access frequency of each of the resources or the data throughput between the arbiter and each of the resources.

FIG. 6B is based on the supposition that the data processing system includes six resources and three data paths. At the initial stage of the operation of the data processing system, one or more data paths cannot be allocated to each of the resources. Thus, the plurality of resources may be divided into number of groups less than or equal to the number of data paths. The six resources may be divided into three groups, and one data path may be allocated to each of the groups. According to the data input/output statuses or data transmission statuses of the respective six resources, which are determined after a set time point, the access frequencies of the first to sixth resources may be decided in descending order. That is, the first resource may be accessed at the highest frequency, and the six resource may be accessed at the lowest frequency. The arbiter 180 (see FIG. 5) may group the first to sixth resources based on the access frequencies. The arbiter may set the first and second resources to the first group, and set the third to six resources to the second group. Then, the arbiter may allocate two data paths to the first group, and allocate one data path to the second group.

FIG. 6C is based on the supposition that the data processing system includes six resources and seven data paths. Since the number of the data paths is larger than the number of the resources, one data path may be allocated to each of the resources, and the remaining data paths may be sequentially allocated to the respective resources, at the initial stage of the operation of the data processing system. Specifically, one data path may be allocated to each of the six resources, and the remaining one data path may be allocated to the first resource. According to the data input/output statuses or data transmission statuses of the respective six resources, which are determined after a set time point, the access frequencies of the first to sixth resources may be decided in descending order. That is, the first resource may be accessed at the highest frequency, and the six resource may be accessed at the lowest frequency. The arbiter 180 (see FIG. 5) may group the first to sixth resources based on the access frequencies. Since the access frequency of the first resource is high, the first resource may be set to the first group, the second and third resources may be set to the second group, and the fourth to sixth resources may be set to the third group. Then, the arbiter may allocate three data paths to the first group, allocate two data paths to the second group, and allocate two data path to the third group.

Referring to FIGS. 6A to 6C, the method for allocating data paths at the initial stage of the operation of the data processing system may be performed in a different manner depending on the number of resources included in the data processing system and the number of data paths. Then, the arbiter may divide the resources into groups again and decide the number of data paths allocated to each of the groups, based on the data transmission statuses of the respective sources, which are determined after the set time point.

In FIGS. 6A to 6C, the access frequencies of the respective resources have been described as factors for determining the data transmission statuses of the respective resources. However, the method for determining the data transmission statuses may be modified in various ways depending on embodiments. For example, the data transmission statuses may be determined according to data throughput between each of the resources and the arbiter 180 (see FIG. 5) or wait counts for the respective resources which are decided by the arbiter.

Figure 7:
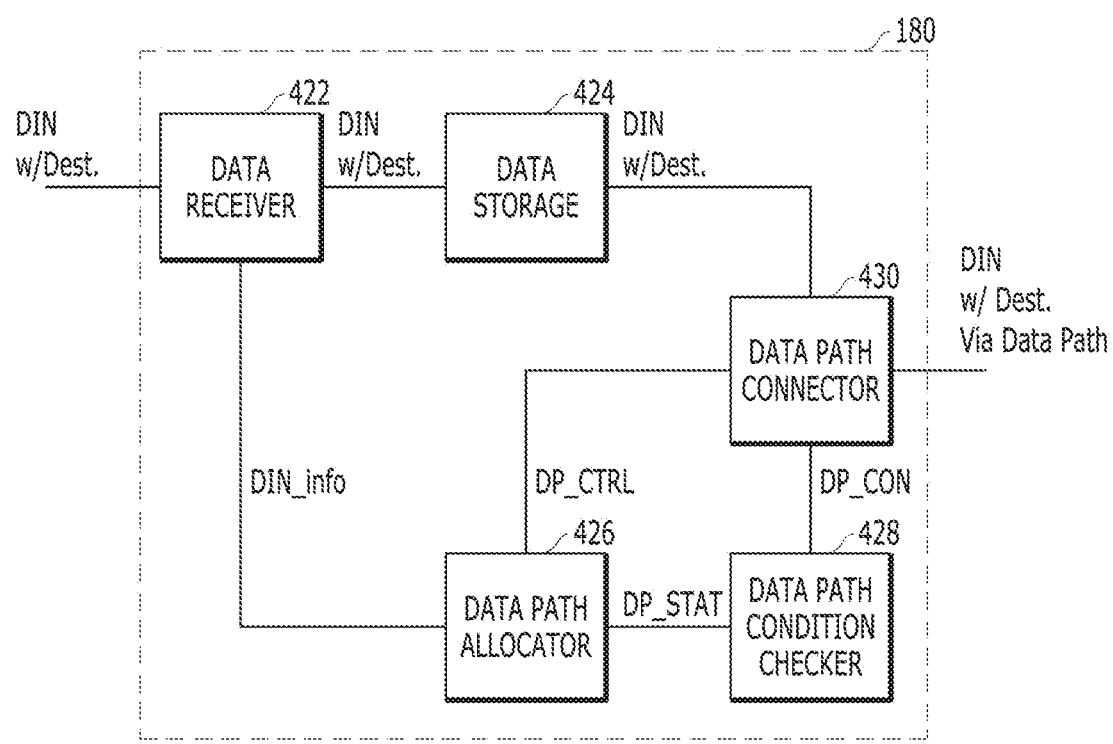
FIG. 7 is a diagram schematically illustrating an example of an arbiter in accordance with an embodiment.

FIG. 7 is a diagram schematically illustrating an example of the arbiter in accordance with an embodiment.

Referring to FIG. 7, the arbiter 180 may include a data receiver 422, a data storage 424 and a data path connector 430. The data receiver 422 may receive, in addition to an access request, data DIN corresponding to the access request transferred from the host 102. The data DIN may be transferred with the destination information (Dest., for example, a specific resource) of the data DIN. Further, the data receiver 422 may transfer allocation-related information DIN_info from an external source to a data path allocator 426. The allocation-related information DIN_info may include the number of groups, into which the resources are to be divided, the number of data paths to be tis allocated to the groups and information on a threshold (see step S16 of FIG. 12). As described below, the data path allocator 426 may generate a control signal DP_CTRL based on the allocation-related information DIN_info. The data DIN received by the data receiver 422 may be temporarily stored in the data storage 424. The data storage 424 may include one or more request buffers for buffering access requests provided from the host 102 and one or more data buffers for buffering the data DIN provided along with the access requests from the host 102. The request buffers and the data buffers may be provided for the resources, respectively, within the data storage 424. The data storage 424 may temporarily store data before the data is transferred to the destination through a data path. For example, the data storage 424 may include the request buffers and the data buffers having the same data structure as a queue, and thus output data according to the order in which the data are buffered. According to a control signal DP_CTRL, which will be described later, the data path connector 430 may select (i.e., allocate) one of the plurality of data paths for a group including the destination (i.e., a specific resource) identified from the destination information Dest.; and transmit, through the selected data path, the data DIN temporarily stored in the data buffers within the data storage 424 to the destination (i.e., a specific resource included in the group, for which the data path is selected).

The arbiter 180 may further include a data path condition checker 428 and the data path allocator 426. The data path condition checker 428 may check conditions DP_CON of a plurality of data paths through which the data stored in the data storage 424 are to be transmitted. The condition signal DP_CON may indicate whether each of the data paths is busy or ready. In an embodiment, the data path condition checker 428 may receive the condition signal DP_CON through, for example, the Carrier Sense Multiple Access with Collision Detection (CSMA/CD) scheme. In this case, the data path connector 430 may generate the condition signal DP_CON. In another embodiment, the data path condition checker 428 may receive, through the data path connector 430, the condition signal DP_CON through identification of the data DIN buffered in the data buffers provided for the respective resources within the data storage 424. When a set amount or greater of data DIN is buffered in the data buffer corresponding to a resource to which a data path is currently allocated, the currently allocated data path may be regarded as busy. In this case, the data storage 424 may generate the condition signal DP_CON. For example, the data path condition checker 428 may check whether the data paths allocated to each of currently arranged groups are busy or ready. The data path allocator 426 may decide a data path through which the data stored in the data storage 424 are to be transmitted, based on the statuses DP_STAT of the data paths, which are transferred by the data path condition checker 428. The data path connector 430 may transmit the data stored in the data storage 424 according to the control signal DP_CTRL for the data path decided by the data path allocator 426.

In an embodiment, when the data DIN stored in the data buffers is to be transferred (along with a corresponding access request buffered in the request buffers) to a corresponding destination (identified by the destination information Dest.) through the data path allocated for the corresponding destination, the data path condition checker 428 may check whether the data path is busy through the condition signal DP_CON provided from the data path connector 430. The data path condition checker 428 may identify the data path allocated for the corresponding destination through the data path allocator 426. For example, when the destination corresponding to the data DIN stored in the data buffers within the data storage 424 is the first resource, the data path condition checker 428 may check the condition DP_CON of the data path allocated to the group including the first resource. If the first and second data paths are allocated to the group including the first resource, the data path condition checker 428 may check the conditions DP_CON of the first and second data paths. When the access request buffered in the request buffers along with corresponding data DIN stored in the data storage 424 cannot be transmitted to the group including the first resource because the first and second data paths are busy, the data path condition checker 428 may increase the group wait count DP_STAT for the corresponding group.

In an embodiment, the data path allocator 426 may decide whether to reallocate a data path or whether to rearrange the groups, tis based on the wait counts DP_STAT for the respective groups, which are transferred by the data path condition checker 428. The data path allocator 426 may manage information of currently arranged groups and current allocation status of the data paths to the currently arranged groups. Based on the statuses DP_STAT of the data paths, the allocation-related information DIN_info and the information of currently arranged groups and current allocation status of the data paths to the currently arranged groups, the data path allocator 426 may perform rearrangement of the groups and/or reallocation of the data paths to the arranged groups to generate the control signal DP_CTRL. Through the control signal DP_CTRL, the data path allocator 426 may control the data path condition checker 428 to electrically couple the host 102 to one or more currently arranged groups including the data DIN to be transferred (along with a corresponding request) to the destination identified the destination information Dest. A data path allocated to a group may be electrically shared by the resources that belong to the group. For example, when the group wait count DP_STAT is increased, it may indicate that more data paths need to be allocated to the corresponding group. On the other hand, when the group wait count DP_STAT is not increased, it may indicate that a proper number of data paths are allocated to the corresponding group or an excessive number of data paths are allocated to the corresponding group. Furthermore, when the group wait count DP_STAT is increased, it may indicate that one or more resources included in the corresponding group need to be moved to another group. On the other hand, when the group wait count DP_STAT is not increased, it may indicate that a proper number of resources are included in the corresponding group or efficiency is not degraded even though additional resources are moved into the corresponding group. Therefore, the data path allocator 426 may decide whether to reallocate the data paths or to rearrange the groups in response to whether the group wait count is changed.

When the total number of data paths is insufficient to cover the groups, the group wait counts for all the groups may be increased. In this case, when the group wait count for a particular group is further increased, it may indicate that more data paths are needed to be allocated to the particular group or some resources of the particular group need to be moved out to another group. The data path allocator 426 may compare the group wait counts for the respective groups and decide whether to reallocate data paths or to rearrange the groups.

Each of the elements (422, 424, 426, 428 and 430) in FIG. 7 may be implemented with any suitable hardware, e.g., circuits, processors, and the like or as a combination of hardware and software/firmware.

Figure 8:
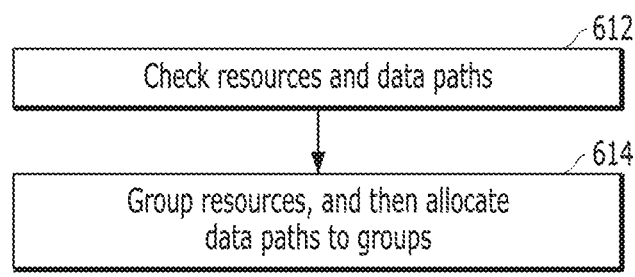
FIG. 8 is a flowchart illustrating a first example of a method for controlling data paths in the data processing system in accordance with an embodiment.

FIG. 8 is a flowchart illustrating a first example of a method for controlling data paths in the data processing system in accordance with an embodiment.

Referring to FIG. 8, the method for controlling a plurality of data paths within the data processing system may include step 612 of tis checking the plurality of resources and the plurality of data paths and step 614 of grouping the plurality of resources and allocating the plurality of data paths to the groups.

Step 612 of checking the plurality of resources and the plurality of data paths may include determining the number of resources that transmit/receive data within the data processing system. Furthermore, step 612 may include checking the number of available data paths between the arbiter and the plurality of resources.

In step 614 of grouping the plurality of resources and allocating the plurality of data paths to the respective groups, the data processing system may decide whether to divide the resources into groups and to allocate the data paths to the respective groups at the initial stage of operation, based on the number of resources and the number of data paths. For example, the number of the groups may be smaller than the number of the resources. Furthermore, the number of the groups may be smaller than or equal to the number of the data paths. The numbers of resources included in the respective groups may be different from one another.

In an embodiment, when the data processing system stores history or log for the use, management and control of the plurality of data paths, the data processing system may refer to the stored history or log. The data processing system may allocate the plurality of data paths to the plurality of resources based on the stored history or log.

Figure 9:
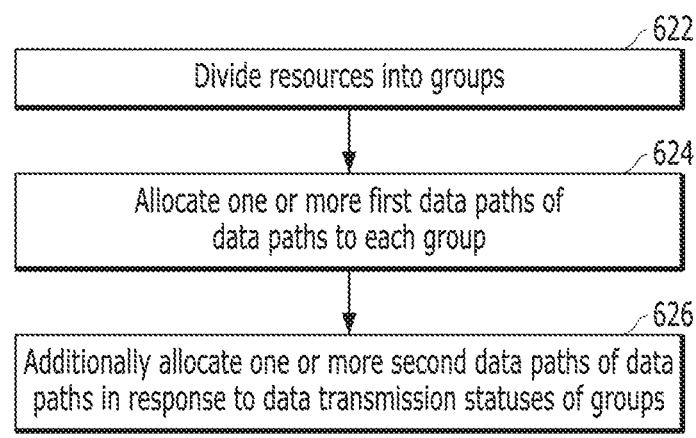
FIG. 9 is a flowchart illustrating a second example of a method for controlling data paths in the data processing system in accordance with an embodiment.

FIG. 9 is a flowchart illustrating a second example of the method for controlling data paths in the data processing system in accordance with an embodiment.

Referring to FIG. 9, the method for controlling the plurality of data paths may include step 622 of dividing a plurality of resources into a plurality of groups, step 624 of allocating one or more first data paths of the plurality of data paths to each of the groups, and step 626 of additionally allocating one or more second data paths of the plurality of data paths in response to data transmission statuses of the respective groups. The plurality of data paths may be divided into the first data paths and the second data paths. The first data path may indicate a data path which is necessarily allocated to each of the groups, and the second data path may indicate a data path which is selectively allocated to each of the groups.

Step 622 of dividing the plurality of resources into the plurality of groups may include dividing the plurality of sources included in the data processing system into two or more groups. The maximum number of the groups may be equal to the smaller between the number of the data paths and the number of the resources.

Through step 624 of allocating one or more first data paths of the plurality of data paths to each of the groups, one or more data paths may be allocated to each of the groups. When a plurality of resources use one data path, the arbiter may transfer data to each of the resources through destination information included in a transmission unit including the data. Furthermore, a transmission unit transferred through a data path may be moved on the data path through a synchronous transfer method which is synchronized with a clock or an asynchronous transfer method which is not synchronized with a clock.

One or more data paths may be allocated to each of the groups. For example, when the data processing system includes three groups and five data paths, two data paths may remain in the case that one data path is allocated to each of the groups at the initial stage of the operation of the data processing system. The remaining two data paths may be sequentially or randomly allocated to two groups of the three groups. In an embodiment, when the data processing system stores the history or log in which the data paths have been used and managed, the remaining two data paths may be allocated based on the history or log.

After all of the data paths are allocated, data may be transmitted/received through the data paths at a set time point. After the set time point, the arbiter may determine the data transmission statuses of the respective groups through step 626 of additionally allocating one or more second data paths of the plurality of data paths in response to the data transmission statuses of the respective groups. In an embodiment, the data transmission status of each group may be decided based on a group wait count. For example, a host may request the corresponding group to process data. However, when data processing is subject to a wait period because a data path allocated to the corresponding group is busy, the arbiter may compare the group wait count, which is increased due to the processing wait, and a total wait count, which is also increased due to the processing wait. The result of the comparison between the group count wait for each group and the total wait count may affect additional allocation of the second data paths, as described below.

Based on the data transmission status of each group, the data paths allocated to the corresponding group may be reallocated. The one or more first data paths allocated to each of the groups may not be reallocated. The reallocation may be limited to the one or more second data paths which are additionally allocated to each of the groups. For example, when one first data path and two second data paths are allocated to the first group, only the two second data paths may be reallocated. When the wait count of the second group is significantly increased in comparison to the wait count of the first group based on the data transmission statuses of the respective groups, at least one of the two second data paths which have been allocated to the first group may be reallocated to the second group.

For example, all of the second data paths may be allocated to a group having the same group wait count as the total wait count. When the wait count of a specific group is equal to the total wait count, it may indicate that the wait counts of the other groups except the specific group are not increased. In this case, all of the second data paths which are allocated to the respective groups or not allocated may be reallocated to the corresponding group which group wait count is the same as the total wait count.

In an embodiment, a proportional number of second data paths to the ratio of the total wait count to the group wait count may be allocated to the corresponding group. When there are an insufficient number of data paths, the wait counts of all the groups may be increased. In this case, more second data paths may be allocated to a group whose wait count is significantly increased.

In an embodiment, when the group wait count is 0, the second data path allocated to the corresponding group may be reallocated to another group. When the group wait count is 0, it may indicate that the wait count was not increased in the corresponding group. This may indicate that the data path allocated to the corresponding group is available or free. Thus, when a wait count occurs in another group or the wait count of another group is increased, the available or free data path may be reallocated to the another group.

The plurality of resources within the data processing system may be divided into three or more groups. When the plurality of resources are divided into three or more groups, only the second data paths allocated to the respective groups may be reallocated based on the data transmission statuses of the respective groups.

In an embodiment, the first data paths and the second data paths are divided in terms of use, and there is no physical limitation for the division. The plurality of data paths may be used as the first data paths or the second data paths. Furthermore, when three data paths tis are allocated to one group, one of the three data paths may only perform the function of the first data path, and the other two data paths may only perform the function of the second data path. In other words, one of the three data paths may not be fixed to the first data path.

Figure 10:
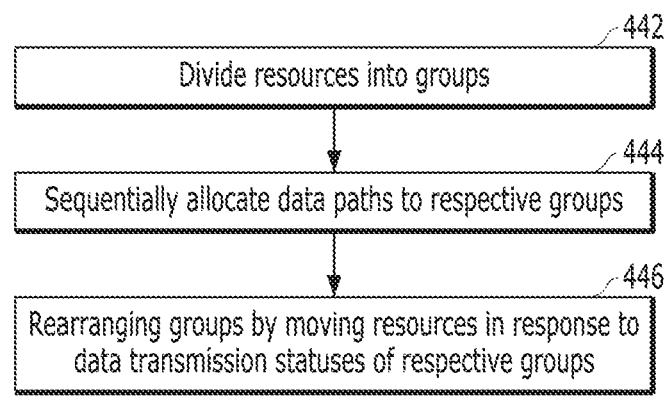
FIG. 10 is a flowchart illustrating a third example of a method for controlling data paths in the data processing system in accordance with an embodiment.

FIG. 10 is a flowchart illustrating a third example of the method for controlling data paths in the data processing system in accordance with an embodiment.

Referring to FIG. 10, the method for controlling the plurality of data paths may include step 442 of dividing a plurality of resources into a plurality of groups, step 444 of sequentially allocating a plurality of data paths to the respective groups, and step 446 of rearranging the groups by moving resources in response to the data transmission statuses of the respective groups.

Step 442 of dividing the plurality of resources into the plurality of groups may include dividing the plurality of sources included in the data processing system into two or more groups. The maximum number of the groups obtained by dividing the plurality of resources may be equal to the smaller of the number of the data paths and the number of the resources.

Step 444 of sequentially allocating the plurality of data paths to the respective groups may include sequentially allocating the plurality of data paths to the respective groups. Through this process, at least one data path may be allocated to each of the groups at the initial stage of the operation of the data processing system. For example, where the data processing system includes three groups and five data paths, first to third data paths may be allocated to the respective groups, and fourth and fifth data paths may be allocated to the first two groups.

In an embodiment, when history or log for the use and management of the data paths in the data processing system is stored, the data paths may be allocated according to the priority. Even when the data paths are allocated to the respective groups according to the priority, at least one data path may be allocated to each of the groups.

Step 446 of rearranging the groups by moving resources in response to the data transmission statuses of the respective groups may include determining the data transmission statuses of the respective groups and then rearranging the groups in response to the data transmission statuses of the respective groups. The process of determining the data transmission statuses of the respective groups may be performed in a similar manner to that described with reference to FIG. 9. For example, the step 446 may include deciding whether the number of data paths allocated to each group is sufficient or not, based on the group wait count. In another embodiment, the data transmission statuses of the respective groups may be estimated based on another standard (for example, data throughput or the like).

In the method for controlling the plurality of data paths, which is described with reference to FIG. 10, the data paths may not be reallocated, but the groups may be rearranged, unlike the embodiment described with reference to FIG. 9. For example, suppose that five resources are divided into first to third groups. At the initial stage of the operation, first and second resources may be classified into the first group, third and fourth resources may be classified into the second group, and a fifth resource may be classified into the third group. When it is determined that data transmission frequently occurs in the first and second resources but data transmission does not frequently occur in the third to fifth resources, the first resource may be rearranged to the first group, the second resource may be rearranged to the second group, and the third to fifth resources may be rearranged to the third group. By rearranging the groups without reallocating the data paths, it is possible to prevent an increase in wait count of a specific group while raising the use and management efficiency of the data paths.

In an embodiment, the methods for controlling the plurality of data paths, which have been described with reference to FIGS. 9 and 10, may be combined and applied to the data processing system. When the groups are rearranged and the data paths allocated to each of the groups are reallocated in response to the data transmission status per group, it is possible to further raise the use and management efficiency of the data paths.

Figure 11:
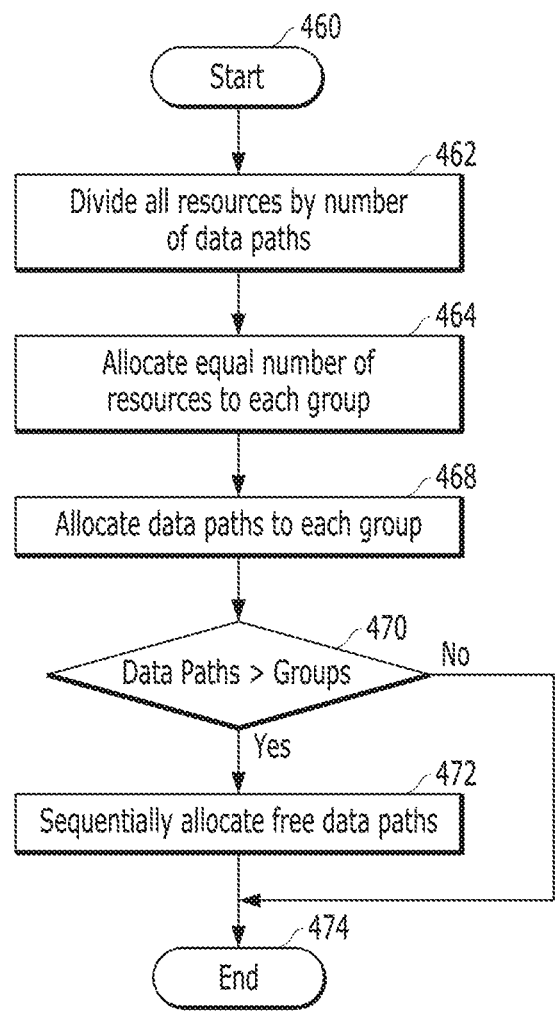
FIG. 11 is a flowchart illustrating a fourth example of a method for controlling data paths in the data processing system in accordance with an embodiment.

FIG. 11 is a flowchart illustrating a fourth example of the method for controlling data paths in the data processing system in accordance with an embodiment. Specifically, FIG. 11 illustrates the method for controlling data paths at the initial stage of the operation of the data processing system or after initialization of the data processing system.

Referring to FIG. 11, the method for controlling data paths may be performed at the initial stage of the operation of the data processing system in step S460.

A plurality of resources may be grouped by dividing all resources included in the data processing system by the number of data paths in step 462, and allocating an equal number of resources to each of the groups in step S464. For example, when the data processing system includes six resources and three data paths, three groups may be set. Two resources may be included in each of the groups. When all the resources are divided by the number of the data paths, the maximum number of the groups may be decided.

For another example, when the data processing system includes eight resources and five data paths, five groups may be set. Three of the five groups may include two resources, but the other two groups may include one resource.

In an embodiment, when the data processing system includes eight resources and five data paths, four groups may be set. Each of the four groups may include two resources.

When the plurality of resources are divided into groups, data paths may be allocated to each of the groups in step 468.

Then, the number of the data paths may be compared to the tis number of the groups in step 470.

When it is determined that the number of the data paths is not larger than the number of the groups (No in step S470), the method for controlling data paths may end in step S474.

When it is determined that the number of the data paths is larger than the number of the groups (Yes in step 470), currently available data paths which are not yet allocated to any group may be sequentially allocated to the respective groups in step 472. When all of the data paths are allocated, the method for controlling data paths may end in step 474.

Figure 12:
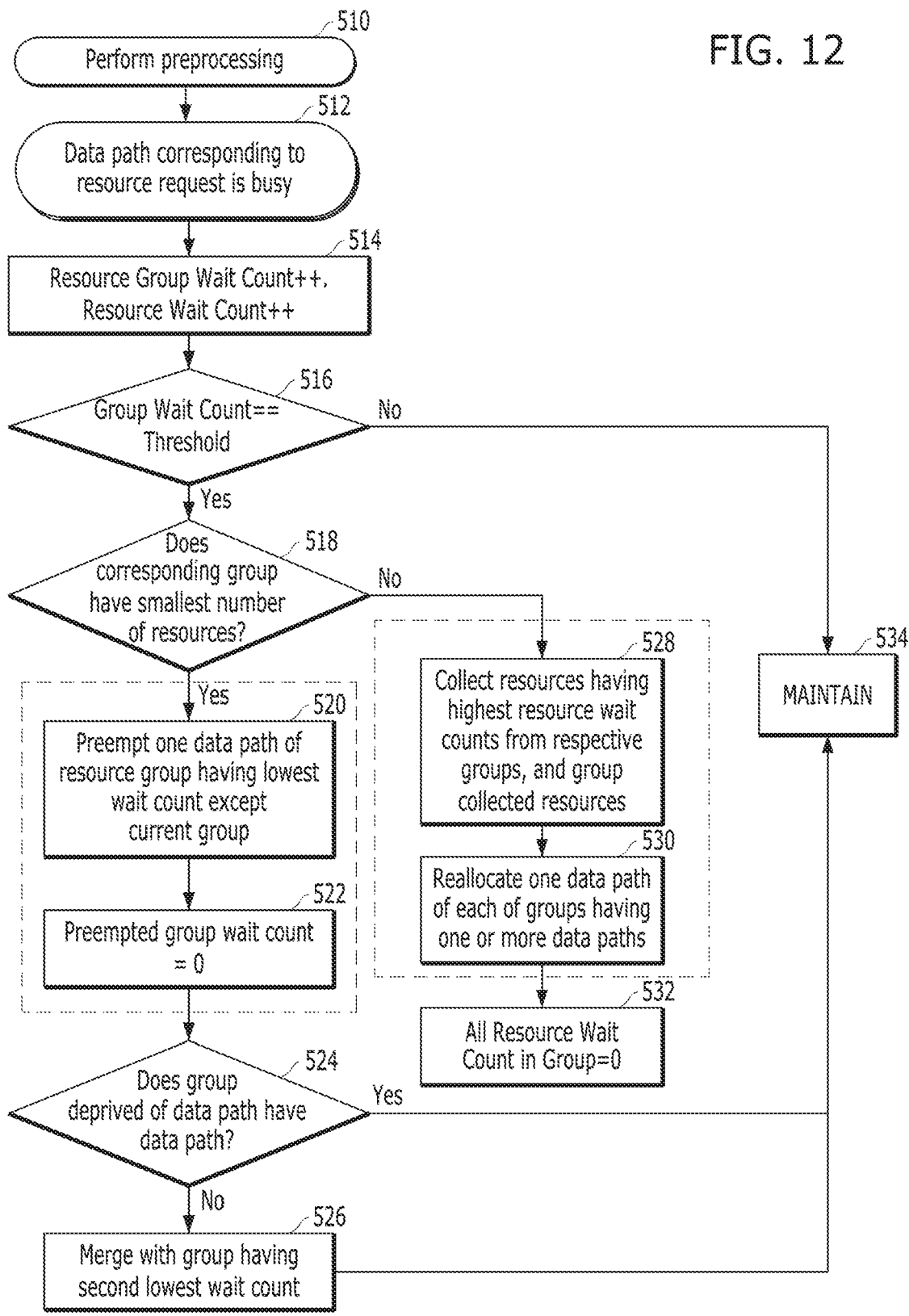
FIG. 12 is a flowchart illustrating a fifth example of a method for controlling data paths in the data processing system in accordance with an embodiment.

FIG. 12 is a flowchart illustrating a fifth example of the method for controlling data paths in the data processing system in accordance with an embodiment.

Referring to FIG. 12, the method for controlling data paths may include performing pre-processing in step S510. The pre-processing may include the process of allocating data paths, which is performed at the initial stage of the operation or after initialization, as described with reference to FIG. 11. Through the pre-processing, the allocation of data paths and groups including one or more resources may be set at the initial stage or before any change.

When data are transmitted/received through the data paths, the states of the data paths may be monitored. Data may be moved through a data path corresponding to a destination (specific resource). When newly requested data cannot be transmitted through the data path because another data is transferred through the data path, the data path may become busy, in step S12.

When new data waits because the data path is busy, a resource group wait count and a resource wait count may be increased in step 514. The resource group wait count may be increased only when data to be transmitted to the corresponding group waits, but the resource wait count may be increased whenever data of the corresponding resource waits, regardless of the group.

Then, the resource group wait count may be compared to a threshold in step S16, in order to determine whether the resource group wait count is equal to the threshold. The threshold may be preset.

When the resource group wait count does not reach, i.e., is less than, the threshold (No in step S516), the state in which the data paths are allocated may be maintained in step S34. The states of the data paths may be monitored without the reallocation of the data paths (proceed to step S20).

When the resource group wait count reaches the threshold (Yes in step S16), the data processing system may determine whether the corresponding group has the smallest number of resources, in step S18.

When the corresponding group is not the group having the smallest number of resources (No in step S18), the data processing system may collect resources having the highest resource wait counts from the respective groups, and group the collected resources, in step 528. Then, the data processing system may reallocate one data path tis of each of the groups having one or more data paths to the group of the collected resources in step S30.

Through the above-described steps 528 and 530, the groups may be rearranged, and the data paths may be reallocated. For example, when it is determined in step S16 that the resource group wait count of the corresponding group reaches the threshold, it may indicate that the corresponding group needs to be rearranged or requires more data paths. Furthermore, when it is determined in step 518 that the corresponding group is not the group having the smallest number of resources, the group may include a plurality of resources. Then, as the resource wait count is increased, one or more data paths need to be allocated to the corresponding resource, or the corresponding resource needs to be controlled not to share the data path with another resource. Through steps 528 and 530, at least one data path may be allocated to a resource where data transfer frequently occurs, and the resource may be con oiled not to share the data path with another resource.

Then, in step S32, the resource wait count in the corresponding group may be reset to 0, after all data DIN in the bottle-neck is transferred to the resources in the rearranged group formed in step S28 through the reallocated data path made in step S30. When a data path is reallocated to a resource included in the corresponding group, the resource wait count before the reallocation may no longer be necessary, because the resource wait count is not information on the newly tis reallocated data path. When the resource wait count is not reset but incremented, the current condition within the data processing system may not be reflected.

When the corresponding group is the group having the smallest number of resources (Yes in step S18), one data path allocated to the group having the lowest group wait count except the corresponding group may be reallocated to the corresponding group in step S20.

In step S22 after the data path is reallocated in step S20, the group wait count of the group to which the data path is additionally allocated may be reset to 0, after all data DIN in the bottle-neck is transferred to the resources in the corresponding group, to which a data path is reallocated through the reallocated data path.

After the resource group wait count of the corresponding group is rearranged, the data processing system may check whether the group deprived of the data path has one or more data paths, in step 524.

When the group deprived of the data path has at least one data path allocated thereto (Yes in step S24), the data processing system may maintain the state in which the data path is allocated, in step S34.

On the other hand, when at least one data path is not allocated to the group deprived of the data path (No in step S24), the group deprived of the data path may be merged with the group having the second lowest group wait count in step S26. Through this operation, the two groups having the lowest group wait counts may be merged.

After the two groups are merged, the data processing system may maintain the state in which the data paths are allocated, in step 534.

In an embodiment, since the group having the lowest group wait count in the data processing system needs to have at least one data path, the data path allocated to the group having the second lowest group wait count may be reallocated and the groups may not be rearranged, in the case that the group having the lowest group wait count has one data path allocated thereto.

In an embodiment, the method for controlling data paths may roughly include a reallocation stage, a merge state and a division stage. The reallocation stage may include steps 520 and 522. In the reallocation stage, a data path of another group may be reallocated to additionally allocate the data path to a group where the usage rate of a data path for transmitting/receiving data to/from a resource is high.

The merge stage may include steps 524 and 526. When the group deprived of the data path in the reallocation stage has no data path allocated thereto, the procedure may proceed to the merge stage. In the merge stage, a group where the usage rate of a data path for transmitting/receiving data to/from a resource is not high may be merged with another group, in order to reduce the number of groups.

The division stage may include steps 528 and 530. In the division stage, since a resource where the usage rate of the data path for transmitting/receiving data is high is present in a group because the wait count is high even though the number of resources is low, the corresponding resource may be separated into a separate group, and a data path may be allocated to the group.

Through the reallocation stage, the merge stage and the division stage, the balance between the data paths and the groups including one or more resources within the data processing system may be adjusted.

Through the above-described embodiments, the data processing system can monitor whether a wait count has increased whenever a request for data transfer through a data path is made, and raise the usage efficiency of the data paths through reallocation of the data paths or rearranging of the groups.

The apparatuses in accordance with the embodiments may have the following effects.

The data processing system, the operating method thereof and the method for checking an operation thereof can allocate a plurality of data paths by grouping a plurality of resources within the data processing system, and manage the plurality of data paths, thereby raising data transfer efficiency through the plurality of data paths.

The apparatus and method can divide the plurality of resources in the data processing system into a smaller number of groups than the number of data paths; dynamically vary the number of data paths allocated to each of the groups; and improve the efficiency of data transmission through a plurality of channels between the plurality of resources and a host, that is, reduce data latency and increase data throughput.

The apparatus and method can divide a plurality of resources included in the data processing system into a plurality of groups; allocate one or more channels to each of the groups; and rearrange the groups of resources in order to raise data throughput through the plurality of channels.

The effects obtained by the various embodiments are not limited to those described above. Those skilled in the art will understand from the present disclosure that other advantageous effects are possible.

Although various embodiments have been illustrated and described, it will be apparent to those skilled in the art in light of the present disclosure that various changes and modifications may be made without departing from the spirit and scope of the invention as defined in the following claims.

What is claimed is:

1. A data processing system comprising:
a plurality of resources suitable for processing data;
a host suitable for requesting at least one of the plurality of resources to process the data;
a plurality of data paths suitable for transferring the data between the host and the plurality of resources; and
an arbiter suitable for:
dividing the plurality of resources into a plurality of groups,
allocating at least one first data path of the plurality of data paths to each of the groups,
determining data transmission statuses regarding the plurality of groups by comparing a group wait count of each group to a total wait count, and
rearranging the plurality of groups, based on the transmission statuses, by additionally allocating at least one second data path of the plurality of data paths to each of the groups or by moving at least one resource from one of the plurality of groups to another of the plurality of groups.

2. The data processing system of claim 1, wherein the number of the plurality of groups is smaller than the number of the plurality of resources, and smaller than or equal to the number of the plurality of data paths.

3. The data processing system of claim 1, wherein the numbers of resources included in the respective groups are not equal to one another.

4. The data processing system of claim 1,
wherein the group wait count of each group is increased when processing of the data by a resource belonging to the corresponding group waits because the data path allocated to the corresponding group is busy even though the host requested the resource of the corresponding group to process the data.

5. The data processing system of claim 4, wherein the arbiter additionally allocates, to a group having a group wait count per group that is the same as the total wait count, remaining data paths other than the at least one first data path as the at least one second data path.

6. The data processing system of claim 4, wherein the arbiter additionally allocates the at least one second data path to the respective groups according to ratios of each of the group wait counts to the total wait count.

7. The data processing system of claim 4, wherein, when the group wait count of one of the groups is 0, the arbiter reallocates the at least one second data path, which is currently allocated to the group, to another of the groups.

8. The data processing system of claim 1, wherein the arbiter equally allocates the data paths to the groups according to the number of the groups, the number of the resources within each of the groups, and the number of the data paths before the transfer of the data between the host and the plurality of resources.

9. The data processing system of claim 1, wherein the arbiter reallocates the at least one second data path currently allocated to each of the groups based on the data transmission statuses.

10. The data processing system of claim 1, wherein the arbiter rearranges the respective groups by merging two or more of the groups or dividing a single group into two or more groups.

11. A method for controlling use of a plurality of data paths, the method comprising:
dividing a plurality of resources into a plurality of groups, each of the resources being capable of processing data;
allocating at least one first data path of the plurality of data paths to each of the groups for transfer of the data between the plurality of resources and a host that requests processing of the data;
determining data transmission statuses regarding the plurality of groups by comparing a group wait count of each group to a total wait count; and
rearranging the plurality of groups, based on the data transmission statuses, by additionally allocating at least one second data path of the plurality of data paths to each of the groups or by moving at least one resource from one of the plurality of groups to another of the plurality of groups.

12. The method of claim 11, wherein the number of the plurality of groups is smaller than the number of the plurality of resources, and smaller than or equal to the number of the plurality of data paths.

13. The method of claim 11, wherein the numbers of resources included in the respective groups are not equal to one another.

14. The method of claim 11,
wherein the group wait count of each group is increased when processing of the data by a resource of the corresponding group waits because the data path allocated to the corresponding group is busy even though the host requested the resource of the corresponding group to process the data.

15. The method of claim 14, wherein the additional allocating includes allocating, to a group having a group wait count that is the same as the total wait count, remaining data paths other than the at least one first data path as the at least one second data path.

16. The method of claim 14, wherein the additional allocating includes allocating the at least one second data path to the respective groups according to ratios of each of the group wait counts to the total wait count.

17. The method of claim 14, further comprising reallocating, when the group wait count of one of the groups is 0, the second data path, which is currently allocated to the group, to another of the groups.

18. The method of claim 11, further comprising equally allocating the data paths to the groups according to the number of the groups, the number of the resources within each of the groups, and the number of the data paths before the transfer of the data between the host and the plurality of resources.

19. The method of claim 11, wherein the rearranging is performed by reallocating the at least one second data path currently allocated to each of the groups based on the data transmission statuses.

20. The method of claim 11, wherein the rearranging is performed by merging two or more of the groups or dividing a single group into two or more groups.

21. A storage system comprising:
one or more groups each including one or more memory systems each configured to perform a memory operation in response to a host request provided from a host; and
an allocator operably coupled between the host and the groups, and configured to transfer host data regarding the host request between the host and a memory system within a selected group of the groups by dynamically allocating a transmission path to each of the groups based on an amount of pending host data to be transferred to the respective memory systems within the groups,
wherein the memory systems within each of the groups share one or more transmission paths allocated to the corresponding group.

22. A storage system comprising:
one or more groups each including one or more memory systems each configured to perform a memory operation in response to a host request provided from a host; and
an arranger operably coupled between the host and the respective groups through one or more transmission paths allocated to the respective groups, and configured to transfer host data regarding the host request between the host and a memory system within a selected group of the groups by dynamically arranging the memory systems within the respective groups based on an amount of pending host data to be transferred to the respective memory systems within the groups,
wherein the memory systems within each of the groups share one or more transmission paths allocated to the corresponding group.

\* \* \* \* \*